(12) United States Patent
Au

(10) Patent No.: US 12,341,468 B2
(45) Date of Patent: *Jun. 24, 2025

(54) FRAMELESS SOLAR MODULE MOUNTING

(71) Applicant: Nextracker LLC, Fremont, CA (US)

(72) Inventor: Alexander W. Au, Oakland, CA (US)

(73) Assignee: NEXTRACKER LLC, Fremont, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/635,171

(22) Filed: Apr. 15, 2024

(65) Prior Publication Data
US 2024/0283391 A1 Aug. 22, 2024

Related U.S. Application Data

(63) Continuation of application No. 18/196,313, filed on May 11, 2023, now Pat. No. 11,962,268, which is a (Continued)

(51) Int. Cl.
*F16B 5/06* (2006.01)
*H02S 20/30* (2014.01)
(Continued)

(52) U.S. Cl.
CPC .............. *H02S 20/32* (2014.12); *F16B 5/06* (2013.01); *F16B 5/0607* (2013.01);
(Continued)

(58) Field of Classification Search
CPC ........ F16B 5/06; F16B 5/0635; F16B 5/0607; F16B 5/0621; F16B 5/0664; F24S 25/634; F24S 25/636
See application file for complete search history.

(56) References Cited

U.S. PATENT DOCUMENTS 3,848,388 A * 11/1974 Bretche ................. E04B 1/6112
52/285.3
5,816,238 A 10/1998 Burns et al.
(Continued)

FOREIGN PATENT DOCUMENTS

CN 201374339 Y 12/2009
CN 102052795 A 5/2011
(Continued)

OTHER PUBLICATIONS

International Search Report and Written Opinion for PCT/US2013/073948, filed on Dec. 9, 2013.

*Primary Examiner* — Adriana Figueroa
(74) *Attorney, Agent, or Firm* — Fredrikson & Byron, P.A.

(57) ABSTRACT

In an example, a clamp assembly for a glass on glass solar module for a tracker is included. The assembly has a lower clamp structure characterized by a top-hat shaped rail structure having a length extending from a first end to a second end. In an example, the assembly has an upper clamp structure configured to sandwich a pair of edges of a pair of solar modules with a portion of the lower clamp structure. In an example, the assembly has a locking spacer configured to the pair of edges of the pair of solar modules. In an example, the pair of edges comprises substantially glass material. In an example, the assembly has a pair of key structures configured with the locking spacer. Each of the key structures is affixed to each of the solar modules to physically lock each of the solar modules to the upper clamp structure.

20 Claims, 31 Drawing Sheets

Related U.S. Application Data continuation of application No. 16/546,181, filed on Aug. 20, 2019, now Pat. No. 11,689,150, which is a continuation of application No. 15/379,919, filed on Dec. 15, 2016, now Pat. No. 10,389,294, which is a continuation of application No. 14/735,085, filed on Jun. 9, 2015, now Pat. No. 9,543,888.

(51) Int. Cl.
    *H02S 20/32*      (2014.01)
    *F24S 25/634*    (2018.01)
    *F24S 25/636*    (2018.01)
    *H02S 30/10*      (2014.01)

(52) U.S. Cl.
    CPC .......... *F16B 5/0621* (2013.01); *F16B 5/0635* (2013.01); *F16B 5/0664* (2013.01); *H02S 20/30* (2014.12); *F24S 25/634* (2018.05); *F24S 25/636* (2018.05); *H02S 30/10* (2014.12); *Y02E 10/50* (2013.01)

(56) References Cited

U.S. PATENT DOCUMENTS

| | | | |
|---|---|---|---|
| 6,300,555 B1 * | 10/2001 | Kondo | H01L 31/048 136/251 |
| 8,344,239 B2 | 1/2013 | Plaisted | |
| 8,403,281 B2 * | 3/2013 | Burtscher | F24S 25/33 248/229.24 |
| 8,459,249 B2 | 6/2013 | Corio | |
| 9,127,702 B2 | 9/2015 | Pressler et al. | |
| 9,175,878 B2 * | 11/2015 | Kemmer | H02S 20/23 |
| 9,543,888 B2 | 1/2017 | Au | |
| 10,429,100 B2 * | 10/2019 | Zabel | F16B 2/005 |
| 2003/0034029 A1 | 2/2003 | Shingleton | |
| 2003/0070368 A1 | 4/2003 | Shingleton | |
| 2007/0212935 A1 | 9/2007 | Lenox | |
| 2007/0295390 A1 | 12/2007 | Sheats et al. | |
| 2009/0200443 A1 | 8/2009 | Burtscher et al. | |
| 2010/0263724 A1 | 10/2010 | Tazawa et al. | |
| 2011/0088740 A1 * | 4/2011 | Mittan | F24S 25/636 136/244 |
| 2012/0037214 A1 | 2/2012 | Sagayama | |
| 2012/0073219 A1 | 3/2012 | Zuritis | |
| 2012/0091077 A1 | 4/2012 | Zuritis | |
| 2012/0103401 A1 | 5/2012 | Kitamura et al. | |
| 2012/0138764 A1 * | 6/2012 | Kemple | F24S 80/70 248/316.1 |
| 2012/0180845 A1 | 7/2012 | Corey et al. | |
| 2013/0068275 A1 | 3/2013 | Swahn et al. | |
| 2013/0220395 A1 * | 8/2013 | Babineau, Jr. | F24S 25/35 403/345 |
| 2013/0240008 A1 | 9/2013 | Baker | |
| 2014/0099161 A1 | 4/2014 | Chen | |
| 2014/0169870 A1 | 6/2014 | Pressler et al. | |
| 2015/0000721 A1 | 1/2015 | Au | |
| 2015/0092383 A1 * | 4/2015 | Corio | H02S 20/10 248/214 |
| 2015/0180404 A1 * | 6/2015 | Braunstein | H02S 20/23 24/457 |
| 2015/0288320 A1 * | 10/2015 | Stearns | F24S 25/60 52/173.3 |

FOREIGN PATENT DOCUMENTS

| | | | | |
|---|---|---|---|---|
| DE | 102008009608 A1 * | 10/2009 | | F24J 2/5249 |
| DE | 102009039791 A1 | 3/2011 | | |
| DE | 102016100559 B3 | 6/2016 | | |
| EP | 191273 A1 | 8/1986 | | |
| IT | 0191273 A1 * | 8/1986 | | |
| KR | 100896332 B1 | 4/2009 | | |
| WO | WO-0236919 A1 * | 5/2002 | | E06B 3/62 |
| WO | WO-2009086150 A1 * | 7/2009 | | F24J 2/5258 |
| WO | WO-2012069030 A1 * | 5/2012 | | F24J 2/5256 |
| WO | 2012076949 A1 | 6/2012 | | |
| WO | WO-2013028969 A1 * | 2/2013 | | H01L 31/0488 |

* cited by examiner ent application is a continuation of U.S. patent
FRAMELESS SOLAR MODULE MOUNTING

CROSS-REFERENCE TO RELATED APPLICATION

The present application is a continuation of U.S. patent application Ser. No. 18/196,313 filed on May 11, 2023, which is a continuation of U.S. patent application Ser. No. 16/546,181, filed on Aug. 20, 2019, not U.S. Pat. No. 11,689,150, which is a continuation of U.S. patent application Ser. No. 15/379,919, filed on Dec. 15, 2016, now U.S. Pat. No. 10,389,294, which is a continuation of U.S. patent application Ser. No. 14/735,085, filed on Jun. 9, 2015, now U.S. Pat. No. 9,543,888, the entire contents of each of which is hereby incorporated by reference herein.

BACKGROUND OF THE INVENTION

The present application relates generally to a tracking system for solar panels. More specifically, embodiments of the present invention provide a clamp assembly for a glass on glass solar module configured for a tracking system. In a specific embodiment, a clamp assembly according to the present invention is for a tracking system, among other aspects. There are other embodiments as well.

As the population of the world increases, industrial expansion has lead to an equally large consumption of energy. Energy often comes from fossil fuels, including coal and oil, hydroelectric plants, nuclear sources, and others. As an example, the International Energy Agency projects further increases in oil consumption, with developing nations such as China and India accounting for most of the increase. Almost every element of our daily lives depends, in part, on oil, which is becoming increasingly scarce. As time further progresses, an era of "cheap" and plentiful oil is coming to an end. Accordingly, other and alternative sources of energy have been developed.

Concurrent with oil, we have also relied upon other very useful sources of energy such as hydroelectric, nuclear, and the like to provide our electricity needs. As an example, most of our conventional electricity requirements for home and business use come from turbines run on coal or other forms of fossil fuel, nuclear power generation plants, and hydroelectric plants, as well as other forms of renewable energy. Often times, home and business use of electrical power has been stable and widespread.

Most importantly, much if not all of the useful energy found on the Earth comes from our sun. Generally all common plant life on the Earth achieves life using photosynthesis processes from sun light. Fossil fuels such as oil were also developed from biological materials derived from energy associated with the sun. For human beings including "sun worshipers," sunlight has been essential. For life on the planet Earth, the sun has been our most important energy source and fuel for modern day solar energy.

Solar energy possesses many characteristics that are very desirable! Solar energy is renewable, clean, abundant, and often widespread. Certain technologies have been developed to capture solar energy, concentrate it, store it, and convert it into other useful forms of energy.

Solar panels have been developed to convert sunlight into energy. As an example, solar thermal panels often convert electromagnetic radiation from the sun into thermal energy for heating homes, running certain industrial processes, or driving high grade turbines to generate electricity. As another example, solar photovoltaic panels convert sunlight directly into electricity for a variety of applications. Solar panels are generally composed of an array of solar cells, which are interconnected to each other. The cells are often arranged in series and/or parallel groups of cells in series. Accordingly, solar panels have great potential to benefit our nation, security, and human users. They can even diversify our energy requirements and reduce the world's dependence on oil and other potentially detrimental sources of energy.

Although solar panels have been used successfully for certain applications, there are still limitations. Often, solar panels are unable to convert energy at their full potential due to the fact that the sun is often at an angle that is not optimum for the solar cells to receive solar energy. In the past, various types of conventional solar tracking mechanisms have been developed. Unfortunately, conventional solar tracking techniques are often inadequate. These and other limitations are described throughout the present specification, and may be described in more detail below.

From the above, it is seen that techniques for improving solar systems are highly desirable.

BRIEF SUMMARY OF THE INVENTION

The present application relates generally to a tracking system for solar panels. More specifically, embodiments of the present invention provide a clamp assembly for a glass on glass solar module configured for a tracking system. In a specific embodiment, a clamp assembly according to the present invention is for a tracking system, among other aspects. There are other embodiments as well.

In an example, a solar tracker system is provided. In an example, the solar tracker system has a pair of pillars (or more, not shown). In an example, a torque tube is configured between the pair of pillars. In an example, a plurality of glass-on-glass solar modules spatially disposed between the first end of the torque tube and the second end of the torque tube. In an example, the torque tube is configured to a clamp on one end, which allows the torque tube to pivot about an arc, while stopping on either end of a frame structure, as shown. The frame structure has an open region, where the torque tube is disposed, and each inner region of the frame on either side of the torque tube in a center position serves as a stop region.

Each of the glass on glass solar modules is configured to pivot with the torque tube in a radial direction. In the present example, glass on glass solar modules generally include a pair of glass substrates with a photovoltaic material sandwiched in between the pair of glass substrates.

In an example, a clamp assembly for a glass on glass solar module for a tracker is included. The assembly has a lower clamp structure characterized by a top-hat shaped rail structure having a length extending from a first end to a second end. In an example, the assembly has an upper clamp structure configured to sandwich a pair of edges of a pair of solar modules with a portion of the lower clamp structure. In an example, the assembly has a locking spacer configured to the pair of edges of the pair of solar modules. In an example, the pair of edges comprises substantially glass material. In an example, the assembly has a pair of key structures configured with the locking spacer. Each of the key structures is affixed to each of the solar modules to physically lock each of the solar modules to the upper clamp structure. In an example, the clamp structures, rail, and other rigid elements are made of a suitable material, such as carbon hardened steel, among others.

Various additional objects, features and advantages of the present invention can be more fully appreciated with reference to the detailed description and accompanying drawings that follow.

DESCRIPTION OF THE SPECIFIC EMBODIMENTS

Figure 1:
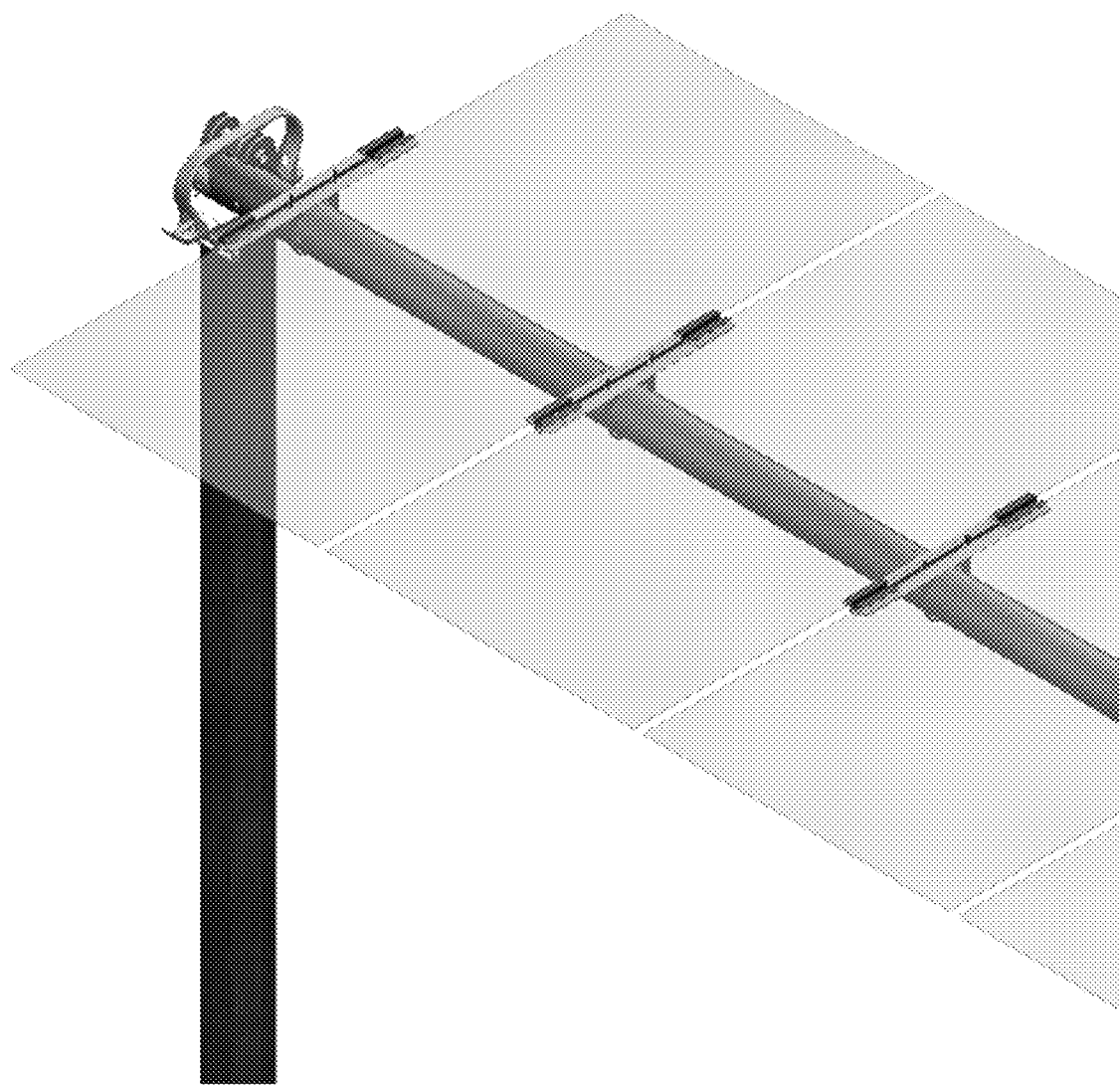
FIG. 1 is a simplified diagram of a solar tracker system according to an embodiment of the present invention.

The present application relates generally to a tracking system for solar panels. More specifically, embodiments of the present invention provide a clamp assembly for a glass on glass solar module configured for a tracking system. In a specific embodiment, a clamp assembly according to the present invention is for a tracking system, among other aspects. There are other embodiments as well.

As shown, the present invention provides a tracker apparatus for solar modules. In an example, the solar modules can be a silicon based solar module, a polysilicon based solar module, a concentrated solar module, or a thin film solar module, including cadmium telluride (CdTe), copper indium gallium selenide (CuIn1-xGaxSe2 or CIGS), which is a direct bandgap semiconductor useful for the manufacture of solar cells, among others. As shown, each of the solar panels can be arranged to form an array. Of course, there can be other variations. In an example, the first pier and the second pier are provided on a sloped surface, an irregular surface, or a flat surface. The first pier and the second pier are two of a plurality of piers provided for the apparatus. In example, the apparatus has a solar module configured in a hanging position or a supporting position.

The tracker apparatus has a first pier comprising a first pivot device and a second pier comprising a drive mount. In an example, the first pier is made of a solid or patterned metal structure, such as a wide beam flange or the like, as shown. In an example, each of the piers is inserted into the ground, and sealed, using cement or other attachment material. Each pier is provided in generally an upright position and in the direction of gravity, although there can be variations. In an example, each of the piers is spatially spaced along a region of the ground, which may be flat or along a hillside or other structure, according to an embodiment. In an example, the first pillar comprises a wide flange beam. In an example, the first pillar and the second pillar can be off-set and reconfigurable.

In an example, the drive mount is capable for construction tolerances in at least three-axis, and is configured to a drive device. The drive device has an off-set clamp device coupled to a bearing device coupled to a clamp member.

In an example, the apparatus has a cylindrical torque tube operably disposed on the first pier and the second pier. In an example, the cylindrical torque tube comprises a one to ten inch diameter pipe made of Hollow Structure Steel (HSS) steel. The cylindrical torque tube comprises a first end and a second end, and a notch. The notch is one of a plurality of notches spatially disposed along a length of the cylindrical torque tube.

In an example, the apparatus has a clamp configured around an annular portion of the cylindrical torque tube and mate with the notch to prevent movement of the clamp. The clamp comprises a support region configured to support a portion of a solar module. The clamp comprises a pin configured with the notch. The apparatus also has a rail or clamp assembly configured to the clamp. The rail or clamp assembly comprises a thread region configured to hold a bolt, which is adapted to screw into the thread and bottom out against a portion of cylindrical torque tube such that the clamp is desirably torqued against the cylindrical torque tube. The apparatus has a solar module attached to the rail or other attachment device-shared module claim or other devices. The cylindrical torque tube is one of a plurality of torque tubes configured in as a continuous structure and extends in length for 80 to 200 meters. Each pair of torque tubes is swage fitted together, and bolted for the configuration.

In an example, the apparatus also has a center of mass of along an axial direction is matched with a pivot point of the drive device. The pivot point of the drive device is fixed in three dimensions while rotating along the center of mass. In an example, the off-set clamp comprises a crank device. In an example, the first pivot device comprises a pivot device configured a clamp device to secure the first end to the cylindrical torque tube. In other examples, the drive device comprises a slew gear. In other examples, the first pivot device can include other variations. The apparatus also has an overrun device configured with the first pivot device. The overrun device comprises a mechanical stop to allow the cylindrical torque tube to rotate about a desired range. Further details of the present tracker apparatus can be found throughout the present specification and more particularly below.

FIG. 1 is a simplified diagram of a solar tracker system according to an embodiment of the present invention. In an example, a solar tracker system is provided. In an example, the solar tracker system has a pair of pillars (or more, not shown). In an example, a torque tube is configured between the pair of pillars. In an example, a plurality of glass-on-glass solar modules spatially disposed between the first end of the torque tube and the second end of the torque tube. In an example, the torque tube is configured to a clamp on one end, which allows the torque tube to pivot about an arc, while stopping on either end of a frame structure, as shown. The frame structure has an open region, where the torque tube is disposed, and each inner region of the frame on either side of the torque tube in a center position serves as a stop region.

Each of the glass on glass solar modules is configured to pivot with the torque tube in a radial direction. In the present example, glass on glass solar modules generally include a pair of glass substrates with a photovoltaic material sandwiched in between the pair of glass substrates.

In an example, the glass on glass solar module is a frameless solar module having a pair of glass substrates sandwiching photovoltaic material in between. The glass on glass module has no frame, and exposed glass edge regions, which make it difficult to mount on a tracker torque tube, which moves, without spatial movement or slippage overtime. An example is a bi-facial solar module, a two-sided glass frameless solar module, among others. Of course, there can be other variations, modifications, and alternatives.

In a preferred embodiment, the solar module is clamped onto the torque tube using a clamp assembly. The clamp assembly is configured to edges of the solar module. The clamp assembly maintains the solar module in position, which does not slide along the clamp assembly. The clamp assembly uses a key structure to mechanically fix the solar module in place, while the module moves from a first position through an arc to a second position, and back again. The key structure, configured with the clamp assembly, maintains the solar module in place. In an example, a locking spacer is configured with the key structure. Further details of the present solar module can be found throughout the present specification and more particularly below.

In an example, each edge of the glass on glass module is held by a clamp assembly, which is configured to the torque tube. A U-bolt sandwiches the clamp assembly configured with the module to the torque tube, as shown. In an example, the clamp assembly can secure a pair of solar modules, as shown. Further details of the present clamp assembly for the solar module can be found throughout the present specification and more particularly below.

Figure 2:
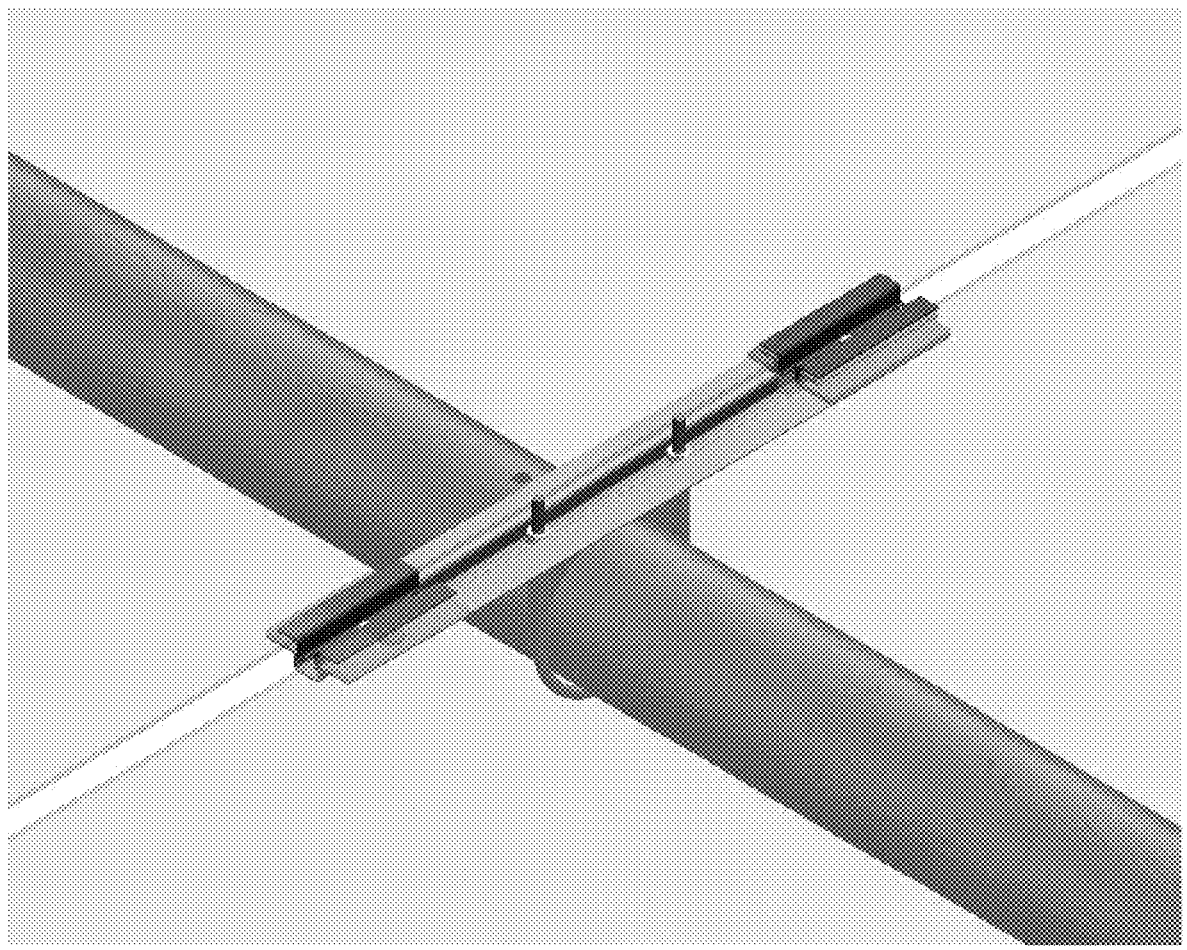
FIG. 2 is a more detailed diagram of a clamp assembly for a glass-on-glass solar module according to an embodiment of the present invention.

FIG. 2 is a more detailed diagram of a clamp assembly for a glass-on-glass solar module according to an embodiment of the present invention. As shown, the clamp assembly has a lower clamp structure characterized by a top-hat shaped rail structure having a length extending from a first end to a second end. The length is positioned between a center region between a pair of solar panels, as shown. The length is sufficiently long to provide mechanical support to each of the solar panels to be moved on a tracker system. In an example, the lower rail also includes a fastener region. In an example, the fastener region is a first opening and a second opening to be used for a U-bolt coupling the lower clamp structure to a torque tube.

In an example, the assembly also has a first upper clamp structure configured to sandwich a first pair of edges of a pair of solar modules with a first portion of the lower clamp structure. In an example, the assembly has a second upper clamp structure configured to sandwich a second pair of edges of the pair of solar modules with a second portion of the lower clamp structure, as shown. The first upper clamp structure is spatially disposed and coupled to a first end region of the lower clamp assembly (see lower left quadrant of drawing) and the second upper clamp structure is spatially disposed and coupled to a second end region of the lower clamp assembly (see upper right quadrant of drawing).

In an example, the assembly has a U-bolt configured to sandwich a portion of a torque tube with the lower clamp structure using the first opening and the second opening. Additionally, the assembly has a first locking spacer configured to the first pair of edges of the pair of solar modules and a second locking spacer configured to the second pair of edges of the pair of solar modules. The assembly has a pair of first key structures configured with the first locking spacer and a second pair of first key structures configured with the second locking spacer. Further details of the assembly, including locking spacers and key structures, will be described throughout the present specification and more particularly below.

Figure 3:
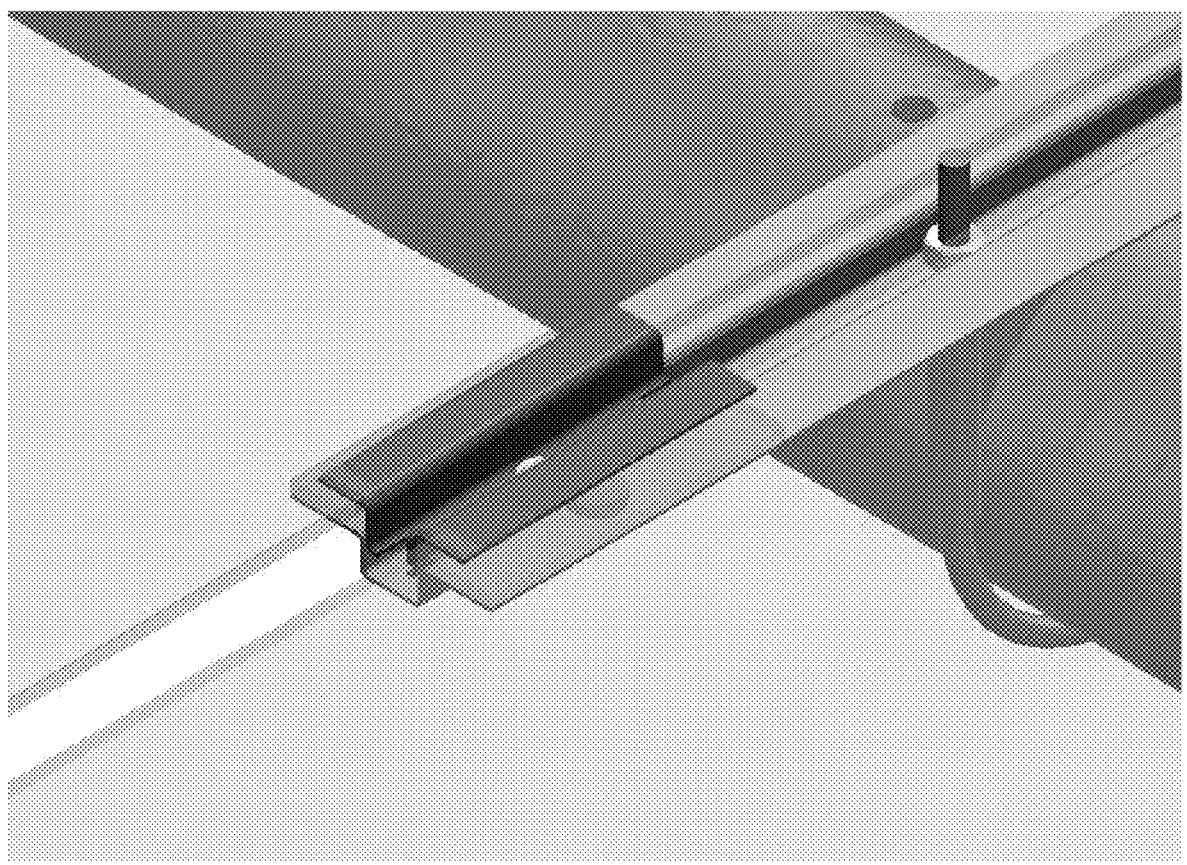
FIG. 3 is a more detailed diagram of the clamp assembly for the glass-on-glass solar module according to an embodiment of the present invention.

FIG. 3 is a more detailed diagram of the clamp assembly for the glass-on-glass solar module according to an embodiment of the present invention. In an example, the assembly also has a first upper clamp structure configured to sandwich a first pair of edges of a pair of solar modules with a first portion of the lower clamp structure. In an example, the first upper clamp structure is spatially disposed and coupled to a first end region of the lower clamp assembly.

In an example, the assembly has a U-bolt configured to sandwich a portion of a torque tube with the lower clamp structure using the first opening and the second opening. Additionally, the assembly has a first locking spacer configured to the first pair of edges of the pair of solar modules. The assembly has a pair of first key structures configured with the first locking spacer. The clamp assembly forms a sandwiched structure including the lower clamp structure, which is underneath the glass module, the locking spacer, which is fitted around the edge of the solar module, and provided between the lower clamp structure, and the upper clamp structure. The key structure spatially and physically locks the glass module to the lower and upper clamp structures, while the locking spacer facilitates the locked configuration. Further details of the assembly, including locking spacers and key structures, will be described throughout the present specification and more particularly below.

Figure 4:
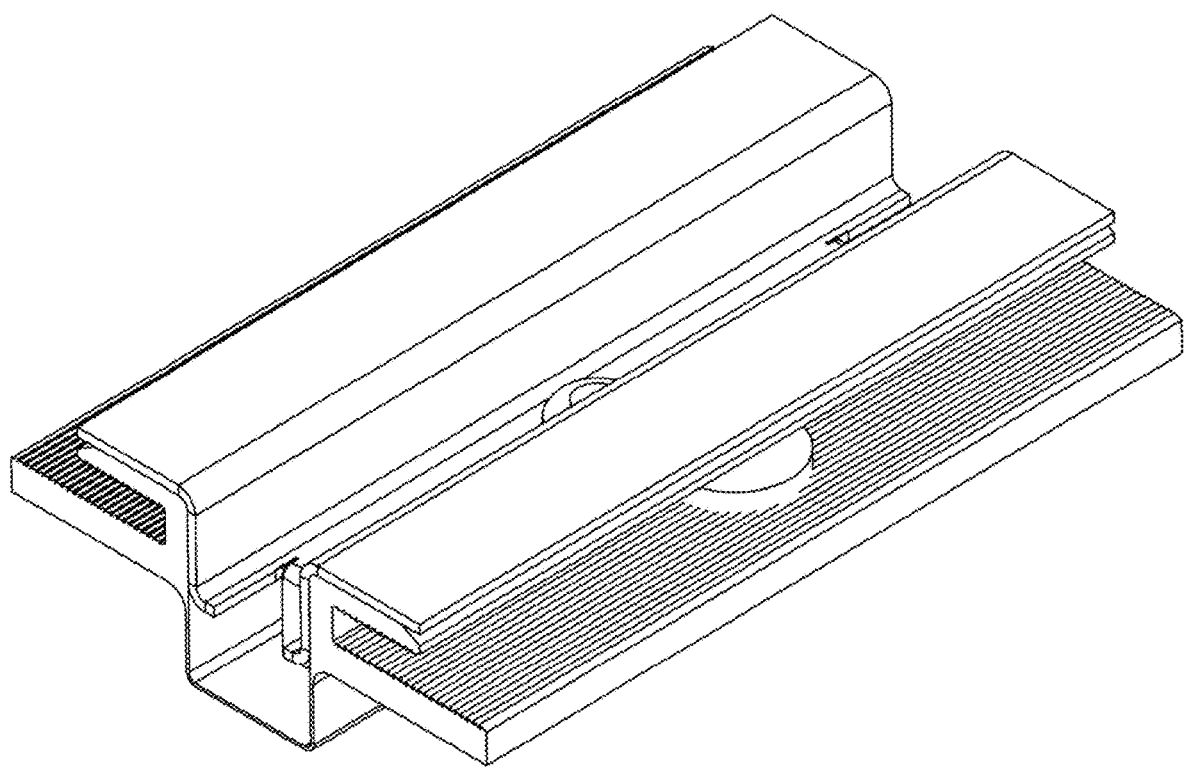
FIG. 4 is a perspective view of a clamp assembly for a glass-on-glass solar module according to an embodiment of the present invention.

FIG. 4 is a perspective view of a clamp assembly for a glass-on-glass solar module according to an embodiment of the present invention. As shown, the clamp assembly has a lower clamp structure characterized by a top-hat shaped rail structure having a length extending from a first end to a second end. The assembly has an upper clamp structure configured to sandwich a pair of edges of a pair of solar modules with a portion of the lower clamp structure. The assembly has a locking spacer configured to the pair of edges of the pair of solar modules. Each of the pairs of edges comprises substantially glass material without a frame structure, which is separate. The assembly has a pair of key structures configured with the locking spacer. Each of the key structures is affixed to each of the solar modules to physically lock each of the solar modules to the upper clamp structure.

In an example, a fastener secures the structure together, including the lower clamp structure, upper clamp structure, and locking spacer with key structure. The fastener can be a bolt or other structure, which can be secured from either a top portion or bottom portion of the sandwiched structure for assembly purposes. Of course, there can be other variations, modifications, and alternatives.

Figure 5:
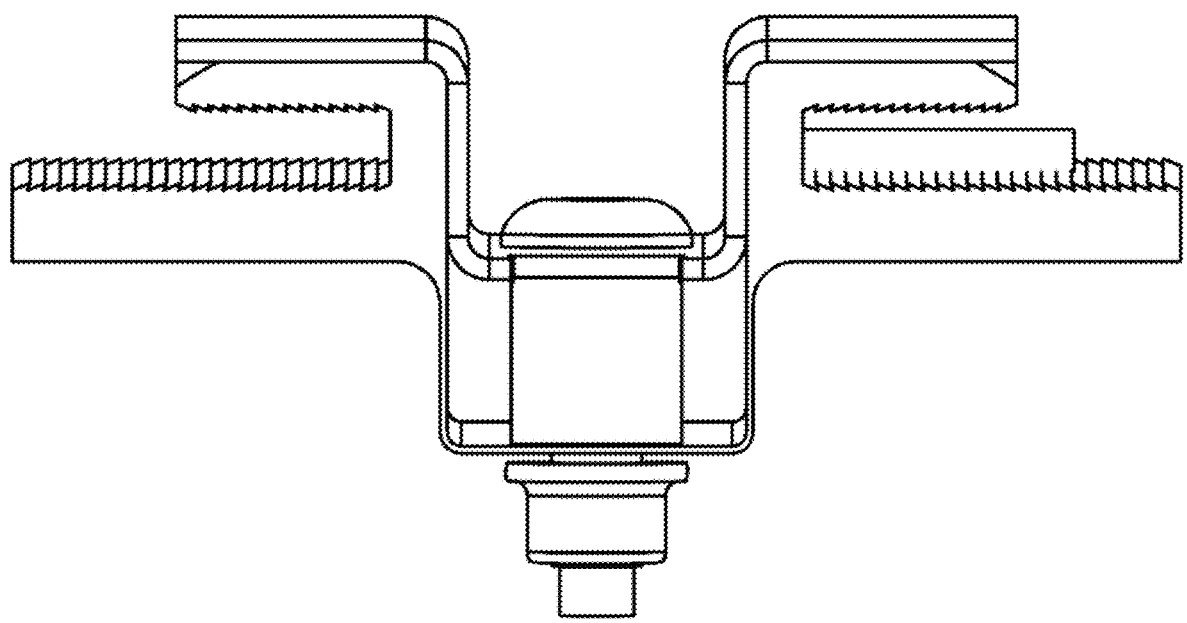
FIG. 5 is a front view of a clamp assembly for a glass-on-glass solar module according to an embodiment of the present invention.

FIG. 5 is a front view of a clamp assembly for a glass-on-glass solar module according to an embodiment of the present invention. As shown, the clamp assembly has a lower clamp structure characterized by a top-hat shaped rail structure having a length extending from a first end to a second end. The assembly has an upper clamp structure configured to sandwich a pair of edges of a pair of solar modules with a portion of the lower clamp structure. The assembly has a locking spacer configured to the pair of edges of the pair of solar modules. Each of the pairs of edges comprises substantially glass material without a frame structure, which is separate. The assembly has a pair of key structures configured with the locking spacer. Each of the key structures is affixed to each of the solar modules to physically lock each of the solar modules to the upper clamp structure.

In an example, a fastener secures the structure together, including the lower clamp structure, upper clamp structure, and locking spacer with key structure. The fastener can be a bolt or other structure, which can be secured from either a top portion or bottom portion of the sandwiched structure for assembly purposes. In an example, the upper clamp structure and lower clamp include an opening provided within a center region for a bolt to be inserted and secured with a nut or other fastener structure. Of course, there can be other variations, modifications, and alternatives.

Figure 6:
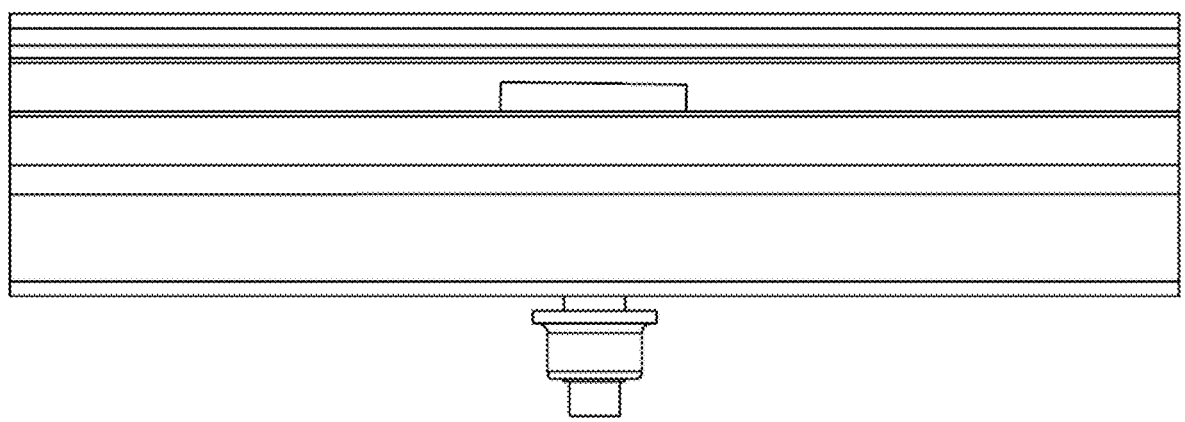
FIG. 6 is a side-view of a clamp assembly for a glass on glass solar module according to an embodiment of the present invention.

FIG. 6 is a side-view of a clamp assembly for a glass on glass solar module according to an embodiment of the present invention. As shown, the clamp assembly has a lower clamp structure characterized by a top-hat shaped rail structure having a length extending from a first end to a second end. The assembly has an upper clamp structure configured to sandwich a pair of edges of a pair of solar modules with a portion of the lower clamp structure. The assembly has a locking spacer configured to the pair of edges of the pair of solar modules. Each of the pairs of edges comprises substantially glass material without a frame structure, which is separate. The assembly has a pair of key structures configured with the locking spacer. Each of the key structures is affixed to each of the solar modules to physically lock each of the solar modules to the upper clamp structure.

Figure 7:
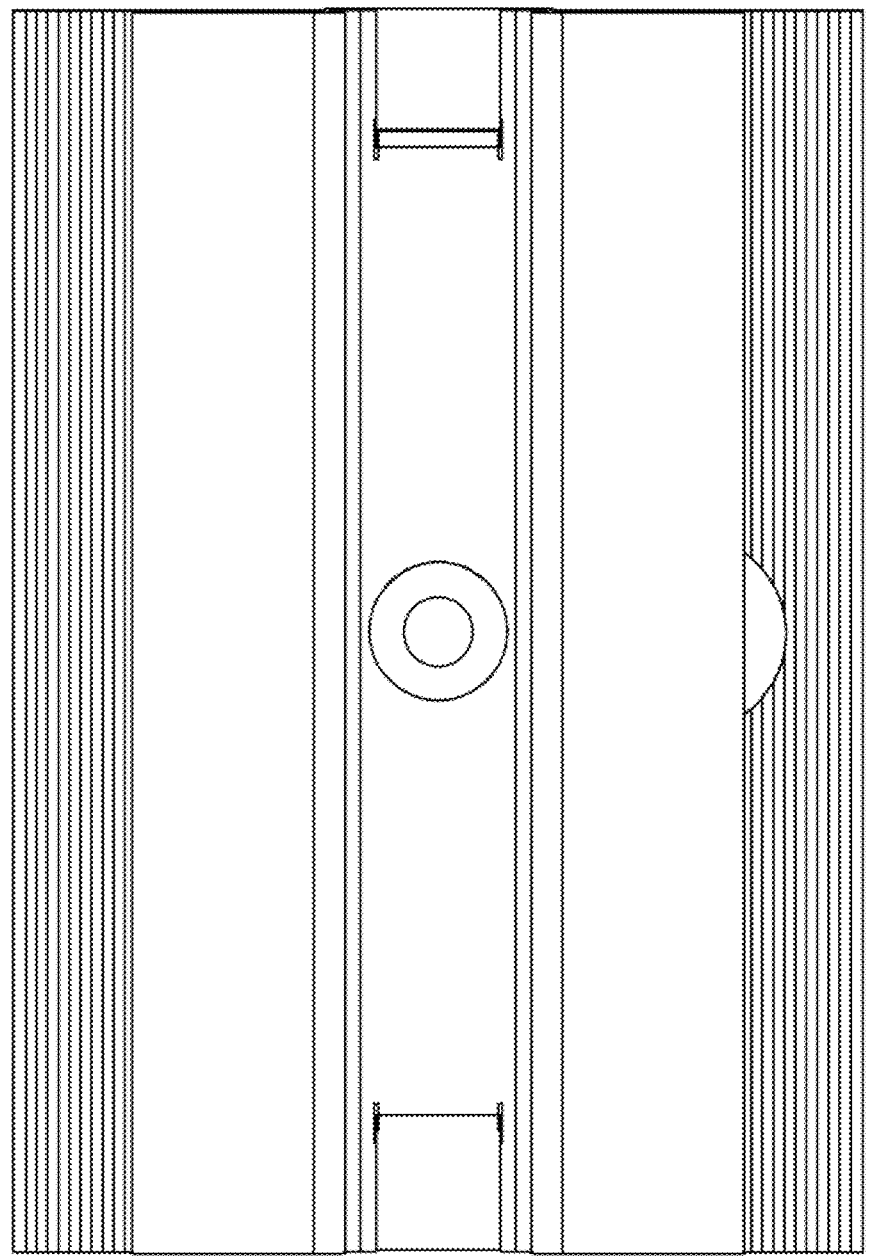
FIG. 7 is a top-view of a clamp assembly for a glass on glass solar module according to an embodiment of the present invention.

FIG. 7 is a top-view of a clamp assembly for a glass on glass solar module according to an embodiment of the present invention. As shown, the top view shows upper clamp structure, which is the top-hat structure. Also shown is the lower portion of the locking spacer, which has ends extending beyond an edge of each of the edges of the top hat structure. As shown on a right hand side, a partial portion of an opening for a key structure is also shown. The portion is annular or can have other shapes and configurations, depending upon the embodiment. In an example, the shape is circular and configured as puck like shape or the like.

Figure 8:
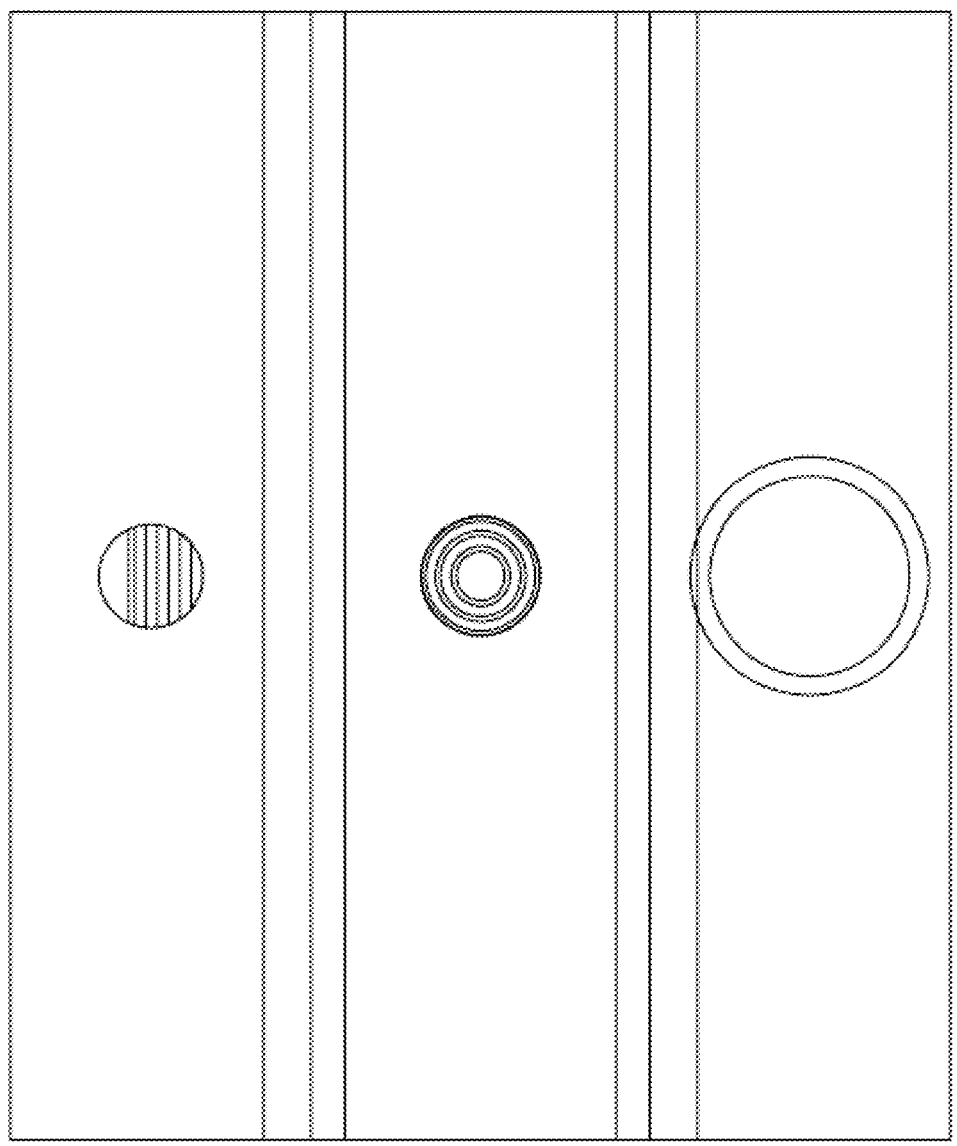
FIG. 8 is a bottom-view of a clamp assembly for a glass on glass solar module according to an embodiment of the present invention.

FIG. 8 is a bottom-view of a clamp assembly for a glass on glass solar module according to an embodiment of the present invention. As shown, the assembly illustrates the bottom view of the assembly structure, including region for the key structure.

Figure 9:
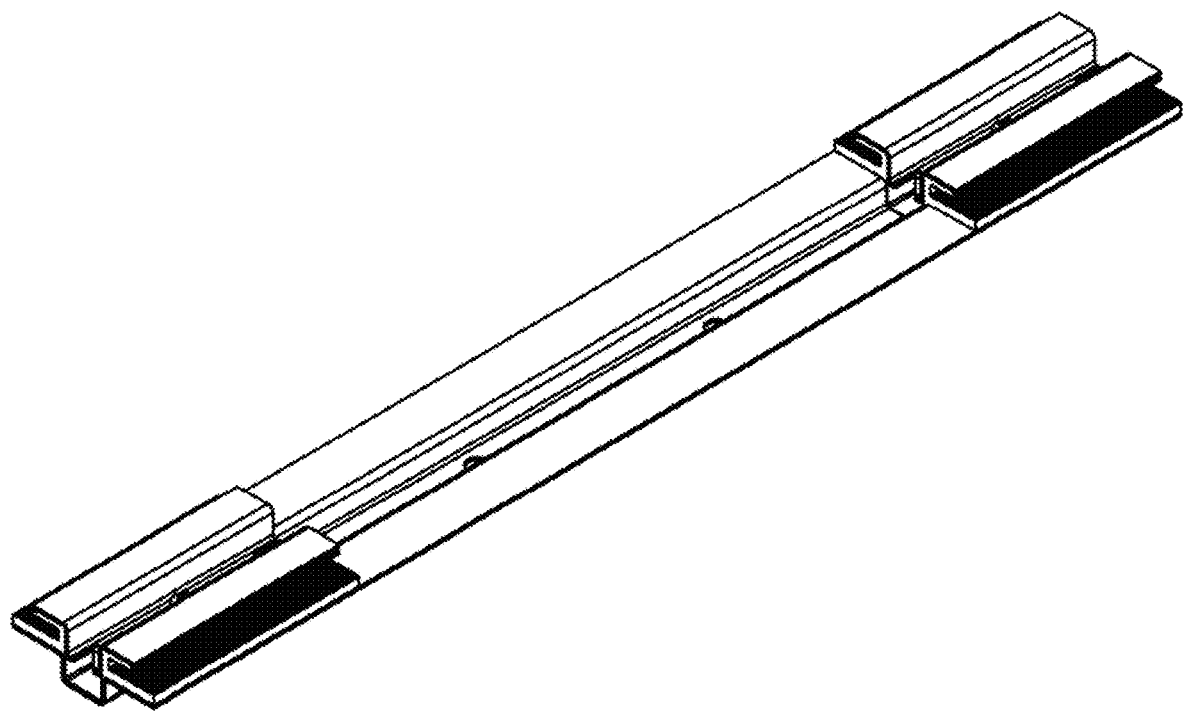
FIG. 9 is a perspective view of a clamp assembly, including a first clamp and a second clamp, according to an embodiment of the present invention.
Figure 10:
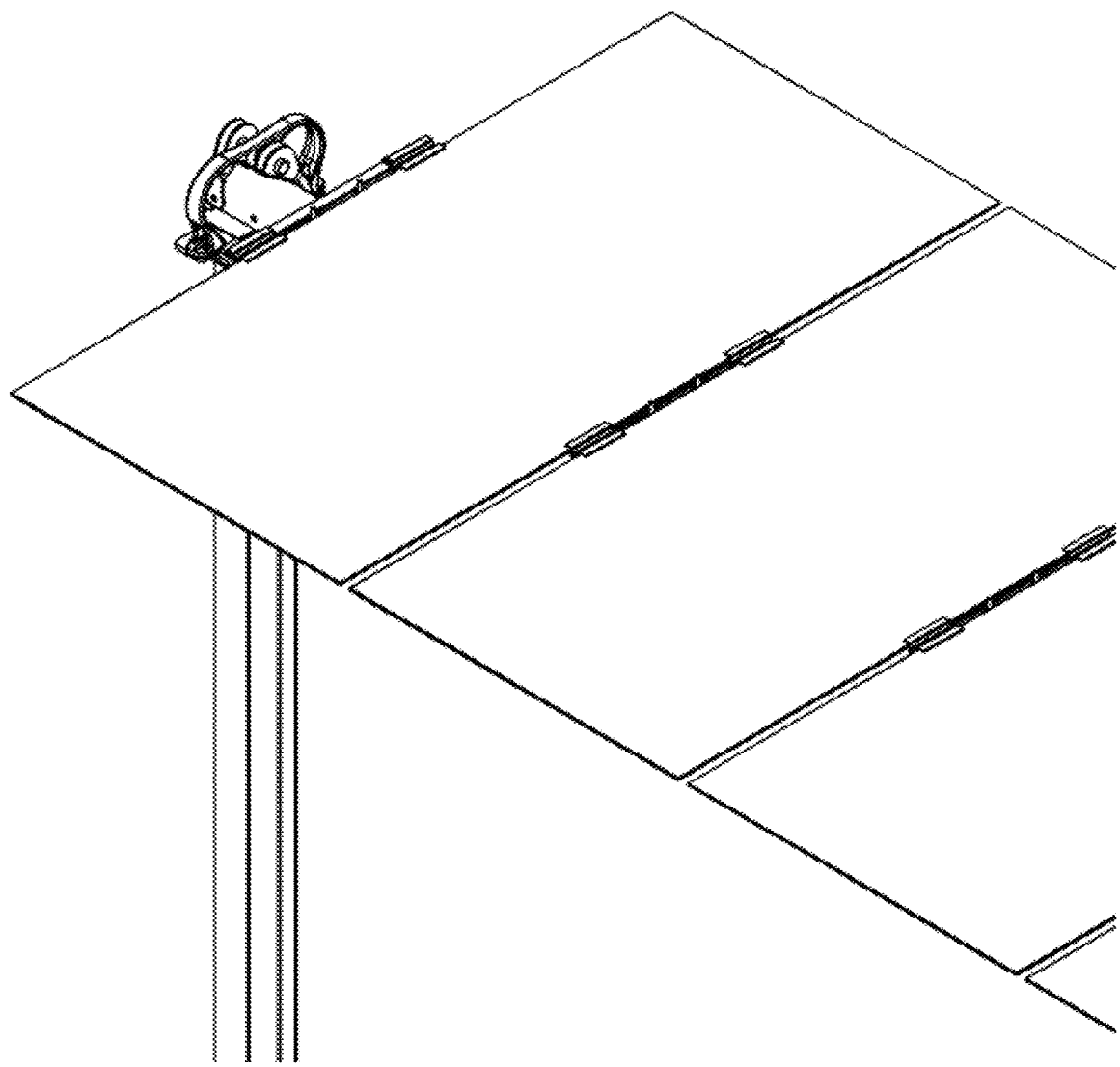
FIG. 10 is a perspective view of a clamp assembly, including a first clamp and a second clamp, on a glass on glass solar module according to an embodiment of the present invention.

FIG. 9 is a perspective view of a clamp assembly, including a first clamp and a second clamp, according to an embodiment of the present invention. FIG. 10 is a perspective view of a clamp assembly, including a first clamp and a second clamp, on a glass on glass solar module according to an embodiment of the present invention.

Figure 11:
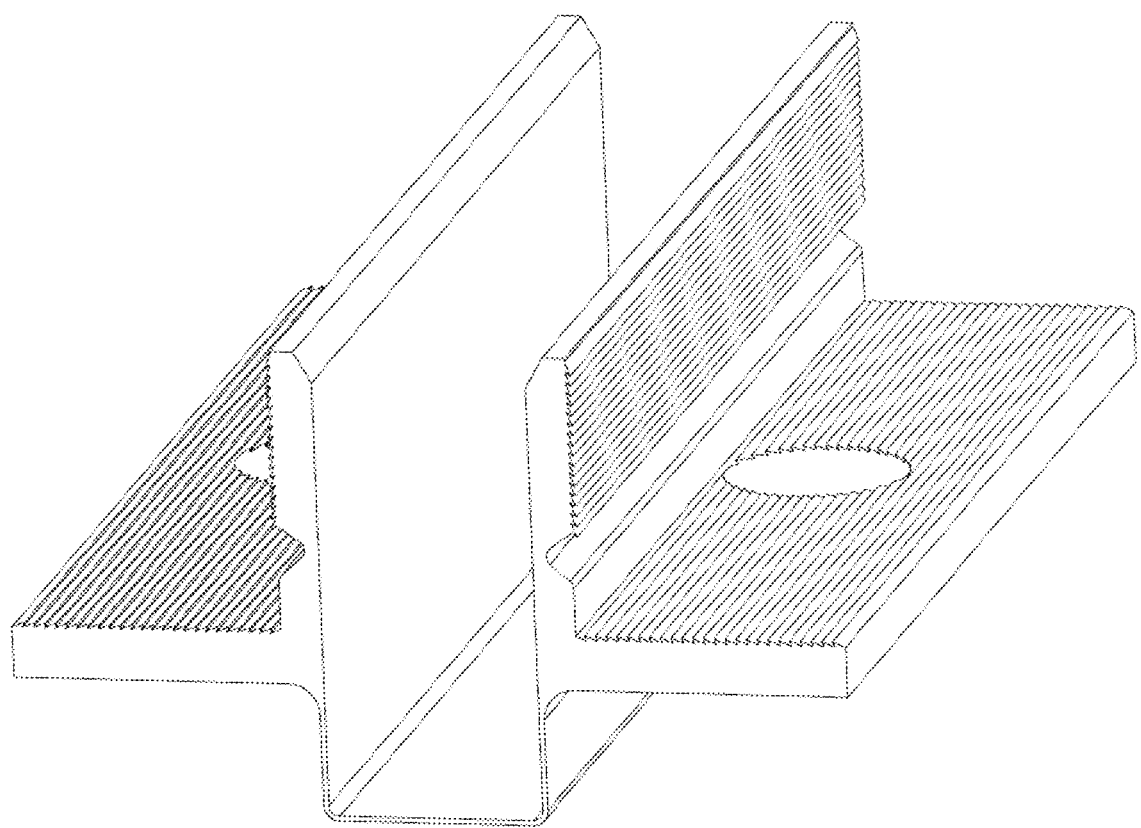
FIGS. 11 and 12 illustrate two different configurations of locking spacers according to embodiments of the present invention.
Figure 12:
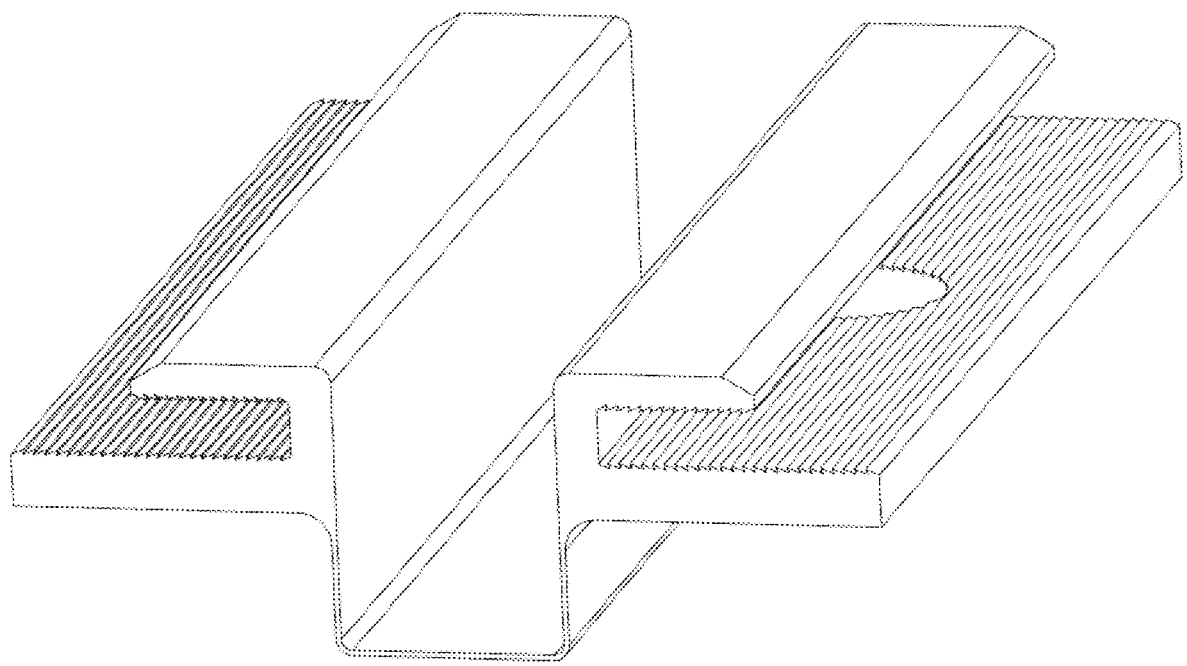

FIGS. 11 and 12 illustrate two different configurations of locking spacers according to embodiments of the present invention. In an example, a locking spacer comprises a lower insulating region having an open region and an upper insulating region. The locking spacer also has a spacer coupling the lower insulating region and the upper insulating region coupling each of the glass on glass solar modules to a portion of the torque tube. In an example, the term "insulating" refers to mechanically and electrically insulating, although there can be other meanings, within one of ordinary skill in the art.

In an example, a key structure (further described below) is configured to an edge region of the glass on the glass on glass solar module. As an example, a polycarbonate puck configured on an edge region of each of the glass on glass solar modules and configured to be sandwiched between the lower insulating region and the upper insulating region such that the polycarbonate puck is adapted to be a male member to be inserted into the open region, which acts as a female portion, to prevent the glass on glass solar module from sliding in a planar direction that is parallel to a major surface region of the glass on glass solar module.

In an example, the locking spacer device has various elements. In an example, the locking spacer device has a lower insulating region having a length, a first width, and an open region. In an example, the lower insulating region is made from a thickness of polymeric material. In an example, the polymeric material is selected from at least one of an ethylene propylene diene monomer (EPDM) or a rubber, among others.

In an example, the lower insulating region is configured parallel to a major plane of a glass on glass solar module. In an example, the device has an upper insulating region having the length and the second width. In an example, the upper insulating region is made from the thickness of polymeric material. In an example, the thickness can be consistent or varied depending upon the embodiment. The device has a spacer region provided between and coupling the lower insulating region and the upper insulating region such that a gap is defined between the lower insulating region and the upper insulating region. In an example, the device has a bend region spatially disposed between the spacer region and the upper insulating region. In an example, the bend region has a thickness dimension b, the thickness dimension b is less than the thickness of material.

In an example, the upper insulating region is configured in a first direction substantially normal to the lower insulating region during a first position for an assembly process, as shown in the Figure and is configured in a second direction substantially parallel to the upper insulating region after the assembly process such that the upper insulating region is moved about the bend region from the first direction to the second direction, as shown in the below Figure.

In an example, the bend region has a v shape to allow the each of the inner v surfaces to come in contact with each other in the second direction. As shown in the Figure, the bend region is about 90 Degrees, each having a surface about 45 Degrees From a line normal to the apex of the v shape structure. Of course, there can be variations, modifications, and alternatives.

In an example, the locking device has an opposite mirror image structure, which is for an opposing solar module. In an example, the device has an opposing lower insulating region, an opposing upper insulating region, and an opposing spacer region provided between and coupling the opposing lower insulating region and the opposing upper insulating region such that an opposing gap is defined between the opposing lower insulating region and the opposing upper insulating region. The device has an opposing bend region spatially disposed between the opposing spacer region and the opposing upper insulating region. The device also has a channel structure coupling the opposing upper insulating region and the opposing lower insulating region with the upper insulting region and the lower insulating region. The channel structure is configured between a pair of solar modules, which are configured to the locking spacer device.

In an example, the locking spacer device is configured with a keyed feature to prevent the locking spacer from a planar movement after the assembly process. In an example, the keyed feature is a structure that can be an opening as shown in the lower insulating region.

In an example, the locking spacer has the lower insulating region. The lower insulating region has a thickness of d1. In an example, the thickness of d1 is configured to allow the lower insulating region to be in a compressive state to physically hold a key structure, such as a polycarbonate puck, in place, while preventing a stress to be caused in a portion of a glass material on the glass-on-glass module, thereby preventing any damage, including a crack, to the portion of the glass material. In an example, the thickness d1 is thicker than a height of the polycarbonate puck during a compressive state after assembly of the clamp structure to prevent the puck from bottoming out against clamp structure, which is rigid, and will not keep the insulating region in the compressive state.

Figure 13:
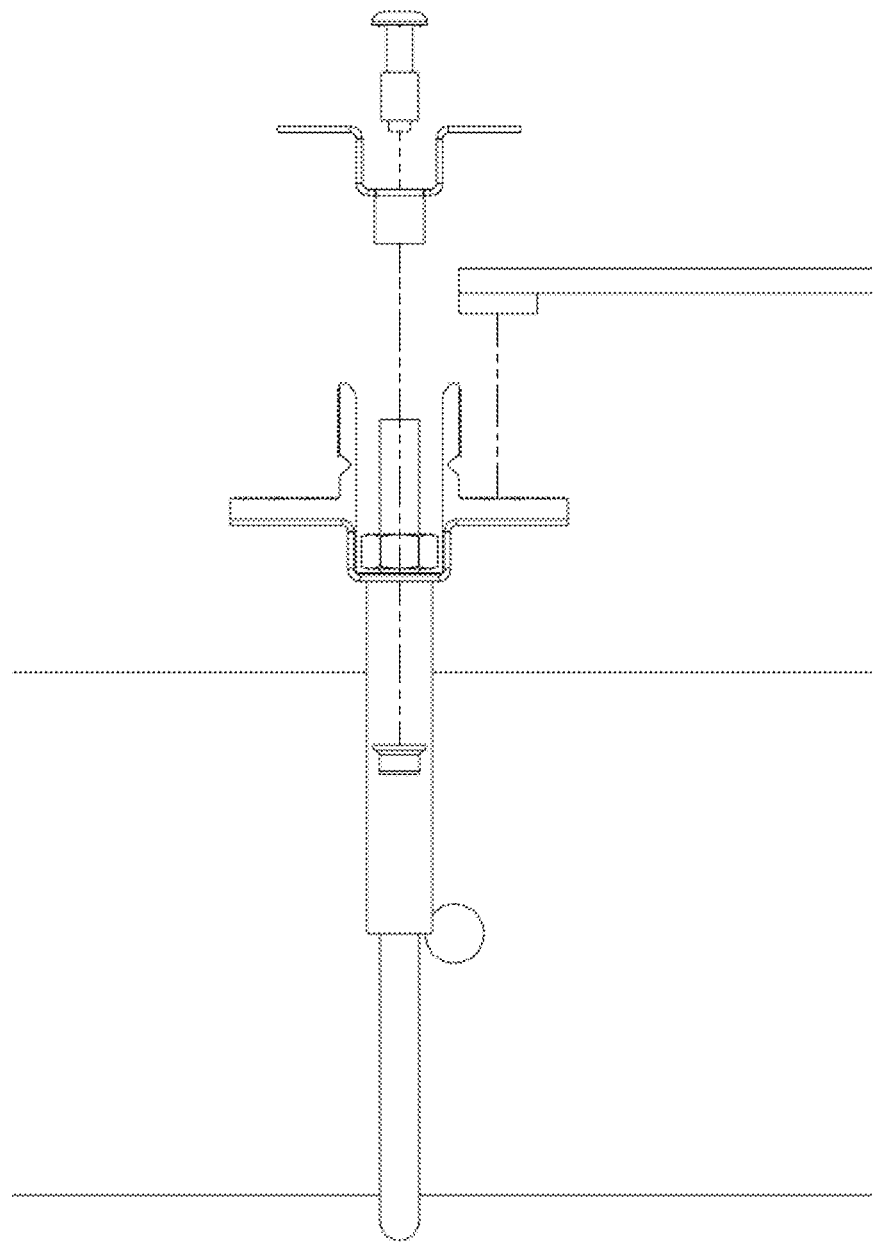
FIG. 13 is a side view of assembling a clamp assembly, including a locking spacer, according to an embodiment of the present invention.

FIG. 13 is a side view of assembling a clamp assembly, including a locking spacer, according to an embodiment of the present invention. As shown, the assembly is an exploded view of upper clamp structure, including a bolt fastener. The assembly has the locking spacer. The assembly also has a solar glass, including a polycarbonate puck affixed to an edge region, which will be inserted into an opening on the locking spacer. The assembly also shows the U-bolt coupled to a periphery of the torque tube.

Figure 14:
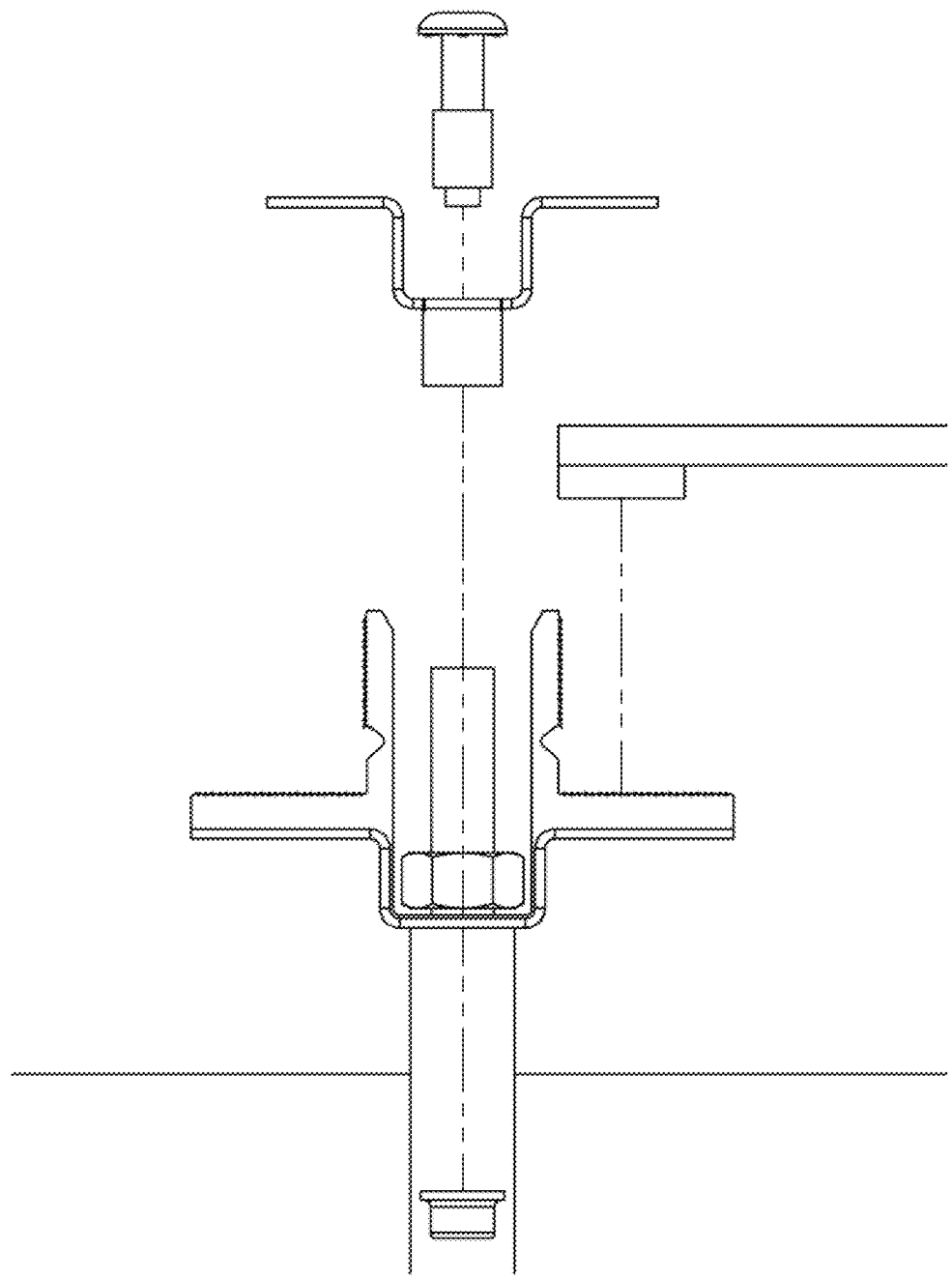
FIG. 14 is a more detailed side view of assembling a clamp assembly, including a locking spacer, according to an embodiment of the present invention.

FIG. 14 is a more detailed side view of assembling a clamp assembly, including a locking spacer, according to an embodiment of the present invention. As shown, the assembly is an exploded view of upper clamp structure, including a bolt fastener. The assembly has the locking spacer. The assembly also has a solar glass, including a polycarbonate puck affixed to an edge region, which will be inserted into an opening on the locking spacer. The assembly also shows the U-bolt coupled to a periphery of the torque tube.

Figure 15:
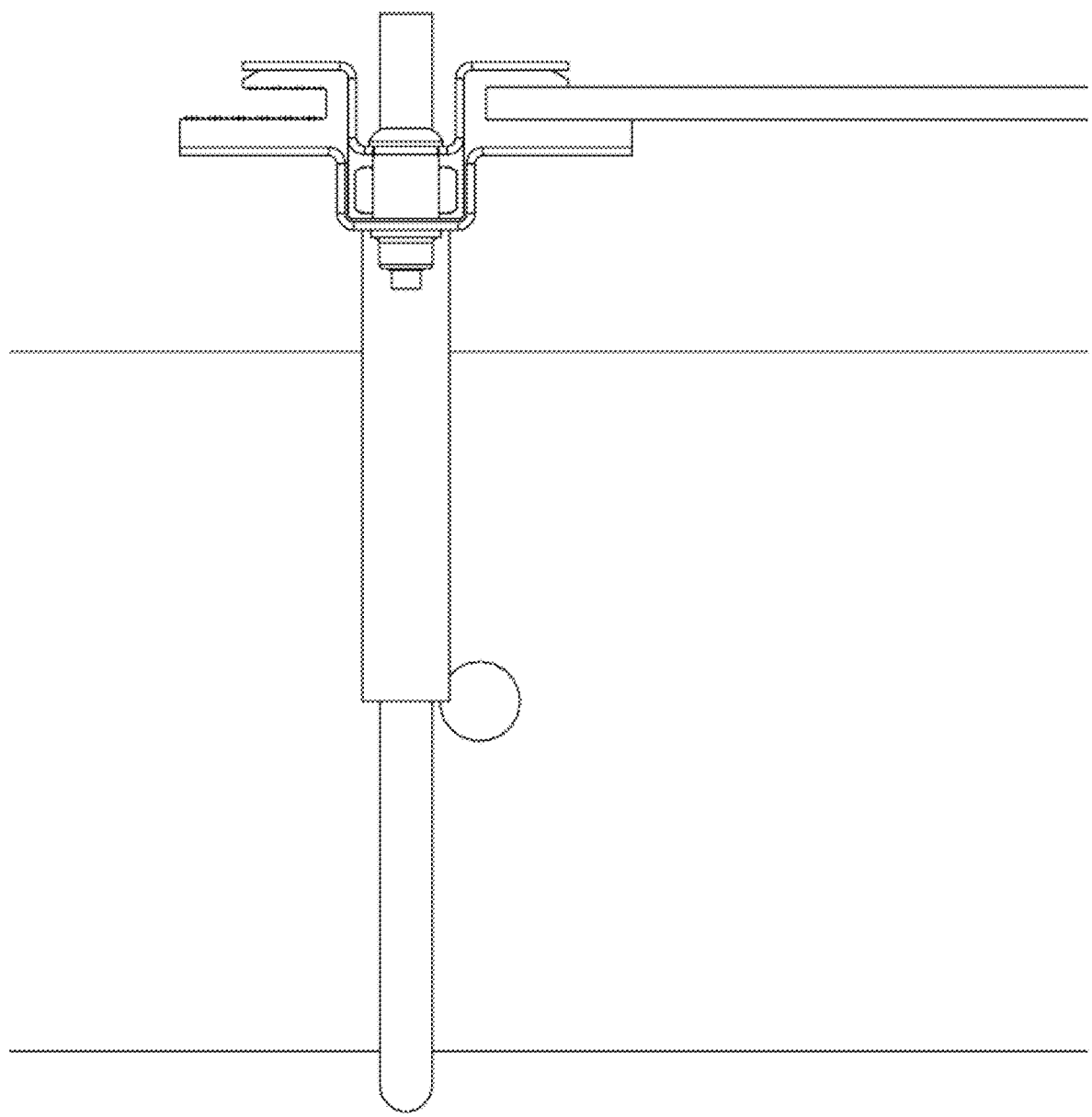
FIG. 15 is a side view of an assembled clamp assembly, including a locking spacer, according to an embodiment of the present invention.

FIG. 15 is a side view of an assembled clamp assembly, including a locking spacer, according to an embodiment of the present invention. As shown, the assembly is an assembled view of upper clamp structure, including a bolt fastener. The assembly has the locking spacer. The assembly also has a solar glass, including a polycarbonate puck affixed to an edge region, which will be inserted into an opening on the locking spacer. The assembly also shows the U-bolt coupled to a periphery of the torque tube.

Figure 16:
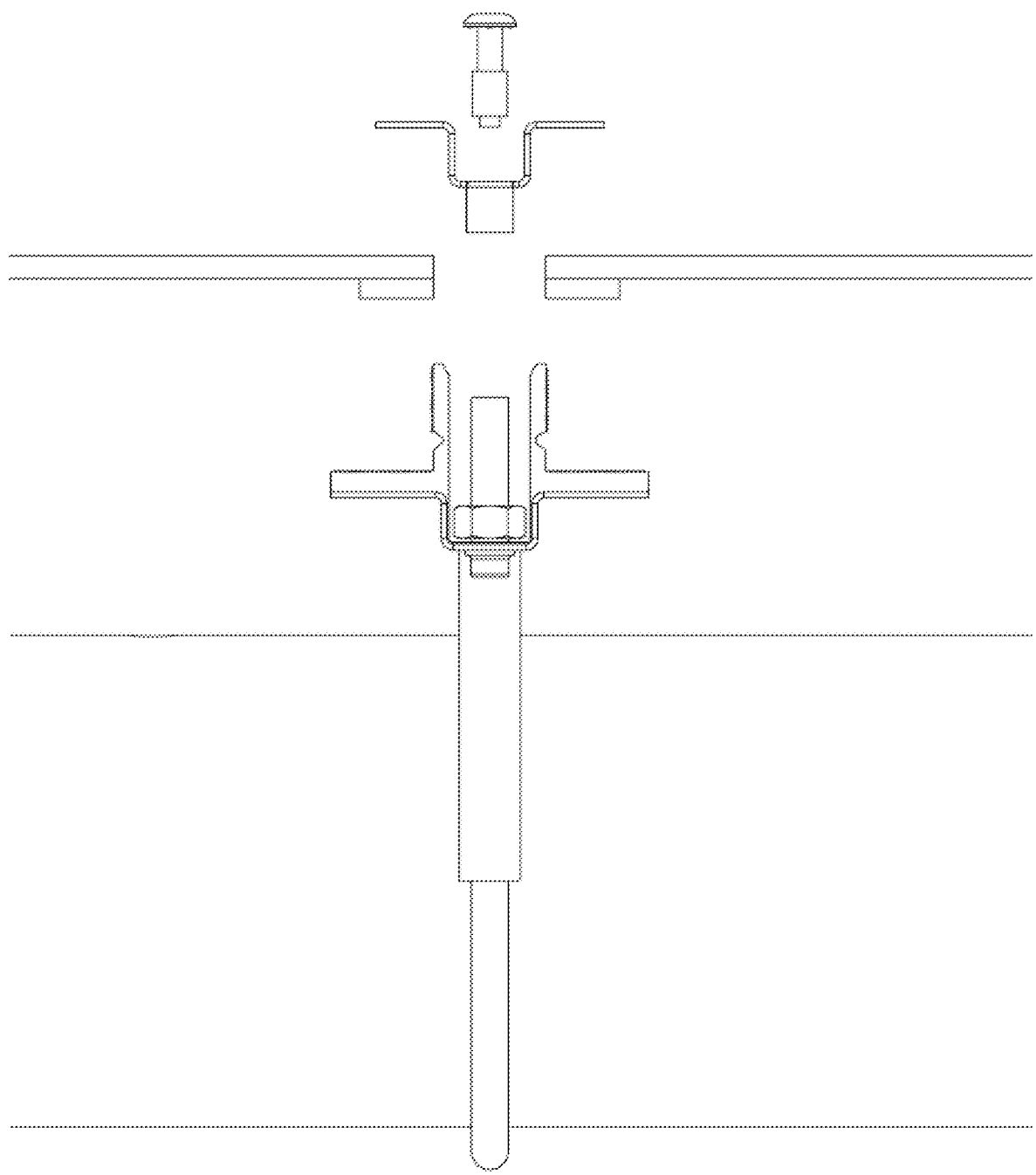
FIG. 16 is a side view of assembling a clamp assembly, including a locking spacer, according to an embodiment of the present invention.

FIG. 16 is a side view of assembling a clamp assembly, including a locking spacer, according to an embodiment of the present invention. As shown, the assembly is an exploded view of upper clamp structure, including a bolt fastener. The assembly has the locking spacer. The assembly also has a solar glass, including a polycarbonate puck affixed to an edge region, which will be inserted into an opening on the locking spacer. The assembly also shows the U-bolt coupled to a periphery of the torque tube.

Figure 17:
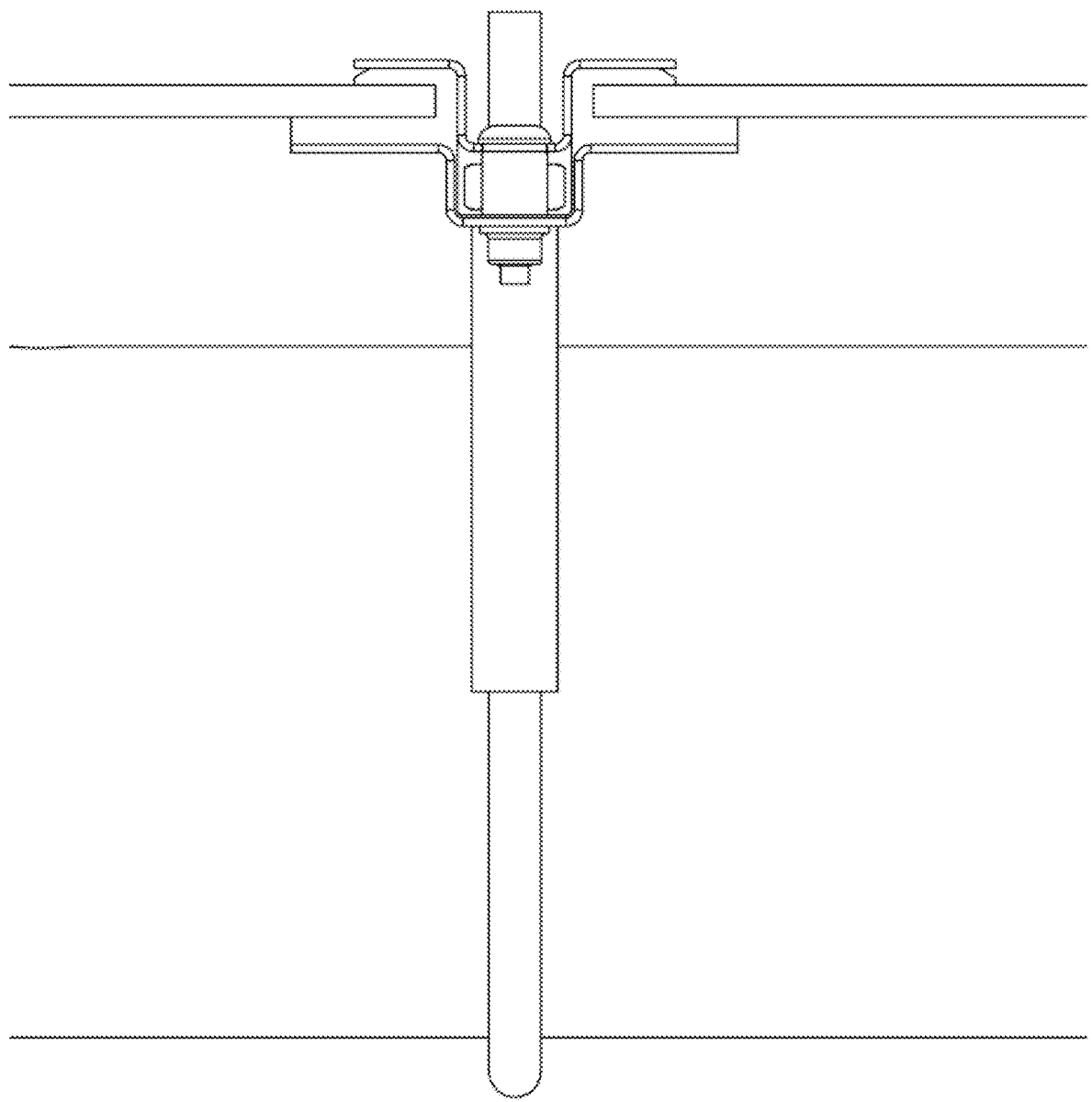
FIG. 17 is a side view of an assembled clamp assembly, including a locking spacer, according to an embodiment of the present invention.

FIG. 17 is a side view of an assembled clamp assembly, including a locking spacer, according to an embodiment of the present invention. As shown, the assembly is an assembled view of upper clamp structure, including a bolt fastener. The assembly has the locking spacer. The assembly also has a solar glass, including a polycarbonate puck affixed to an edge region, which will be inserted into an opening on the locking spacer. The assembly also shows the U-bolt coupled to a periphery of the torque tube.

Figure 18:
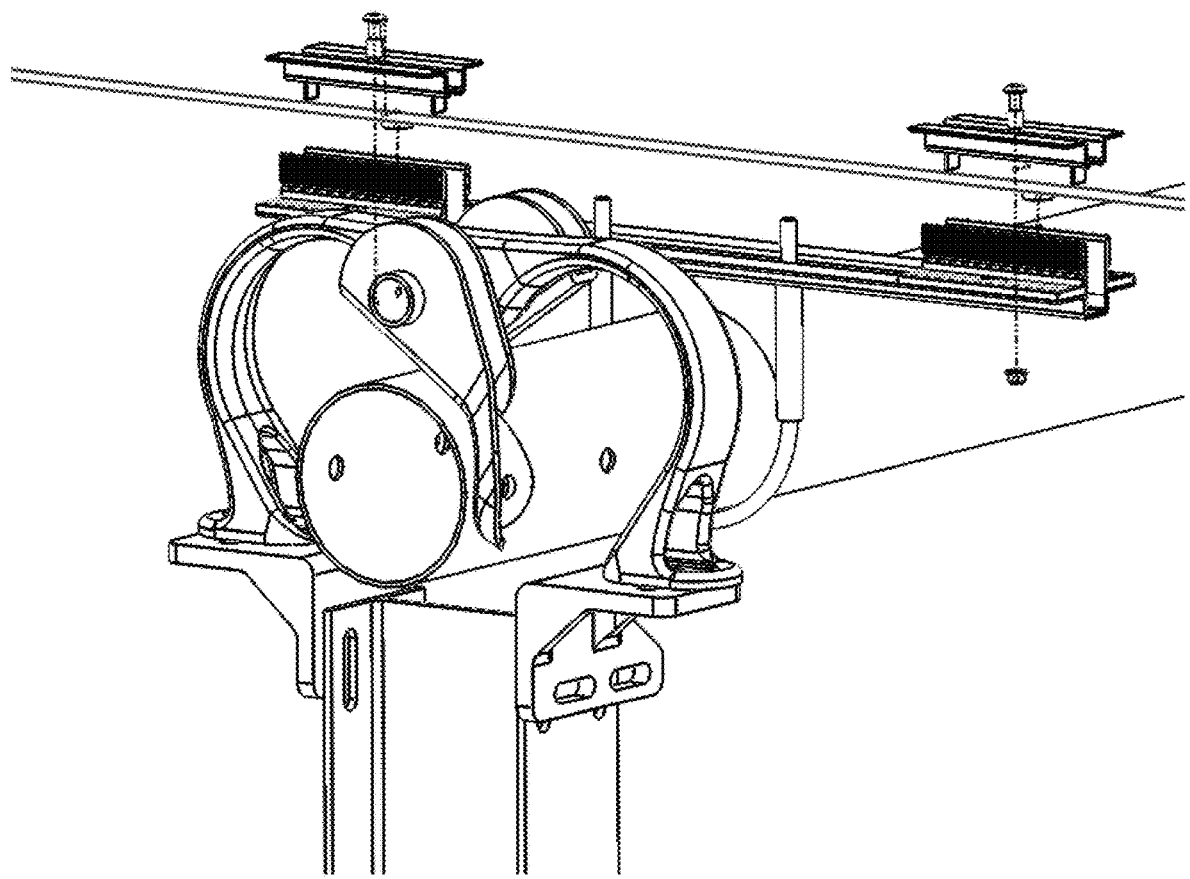
FIG. 18 is a perspective view of assembling a clamp assembly, including a pair of locking spacers, configured on a solar tracker apparatus, according to an embodiment of the present invention.

FIG. 18 is a perspective view of assembling a clamp assembly, including a pair of locking spacers, configured on a solar tracker apparatus, according to an embodiment of the present invention. As shown, the assembly is an exploded view of the upper clamp structures, including first and second, and associated first and second bolt fasteners. The assembly has the locking spacers. The assembly also has a solar glass, including a polycarbonate puck affixed to an edge region, which will be inserted into an opening on the locking spacer. Opposing solar glass is also shown. The assembly also shows the U-bolt coupled to a periphery of the torque tube. In an example, a clamp assembly for the torque tube end is also shown.

Figure 19:
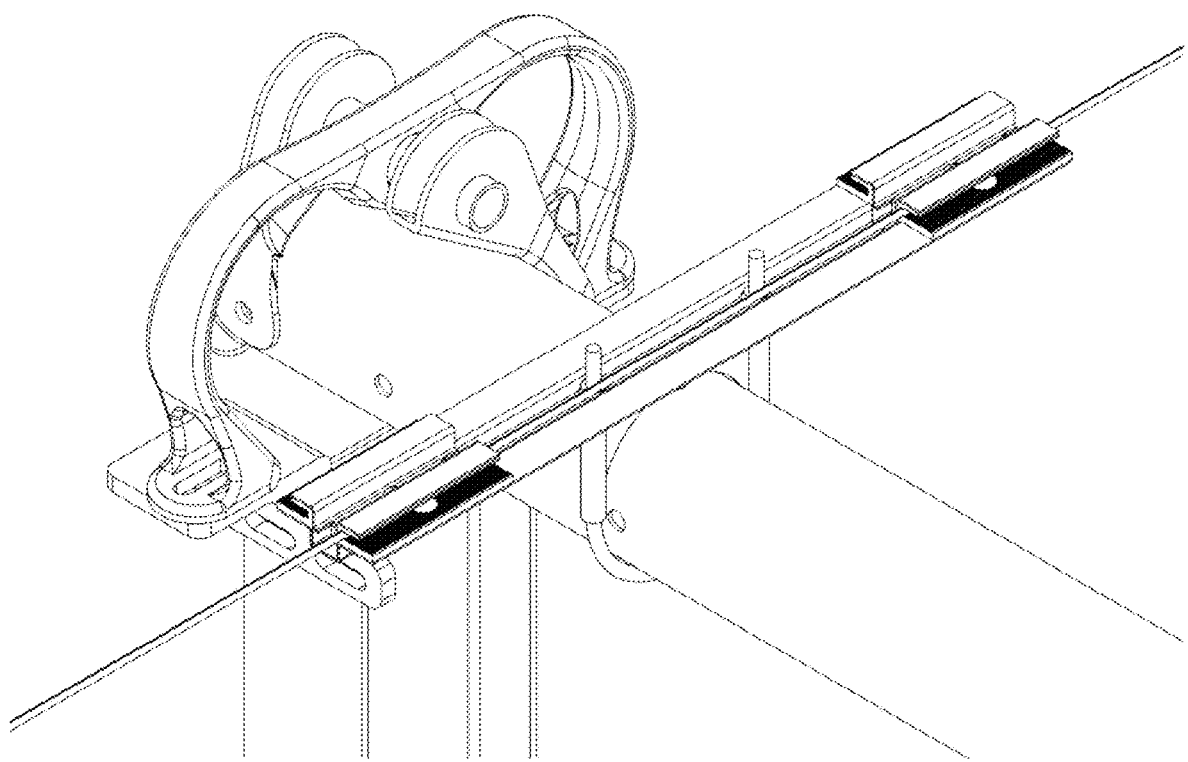
FIG. 19 is a perspective view of an assembled clamp assembly, including a pair of locking spacers, configured on a solar tracker apparatus, according to an embodiment of the present invention.

FIG. 19 is a perspective view of an assembled clamp assembly, including a pair of locking spacers, configured on a solar tracker apparatus, according to an embodiment of the present invention. As shown, the assembly is an assembled view of the upper clamp structures, including first and second, and associated first and second bolt fasteners. The assembly has the locking spacers. The assembly also has a solar glass, including a polycarbonate puck affixed to an edge region, which will be inserted into an opening on the locking spacer. Solar glass is also shown opposing each other. The assembly also shows the U-bolt coupled to a periphery of the torque tube. In an example, a clamp assembly for the torque tube end is also shown.

Figure 20:
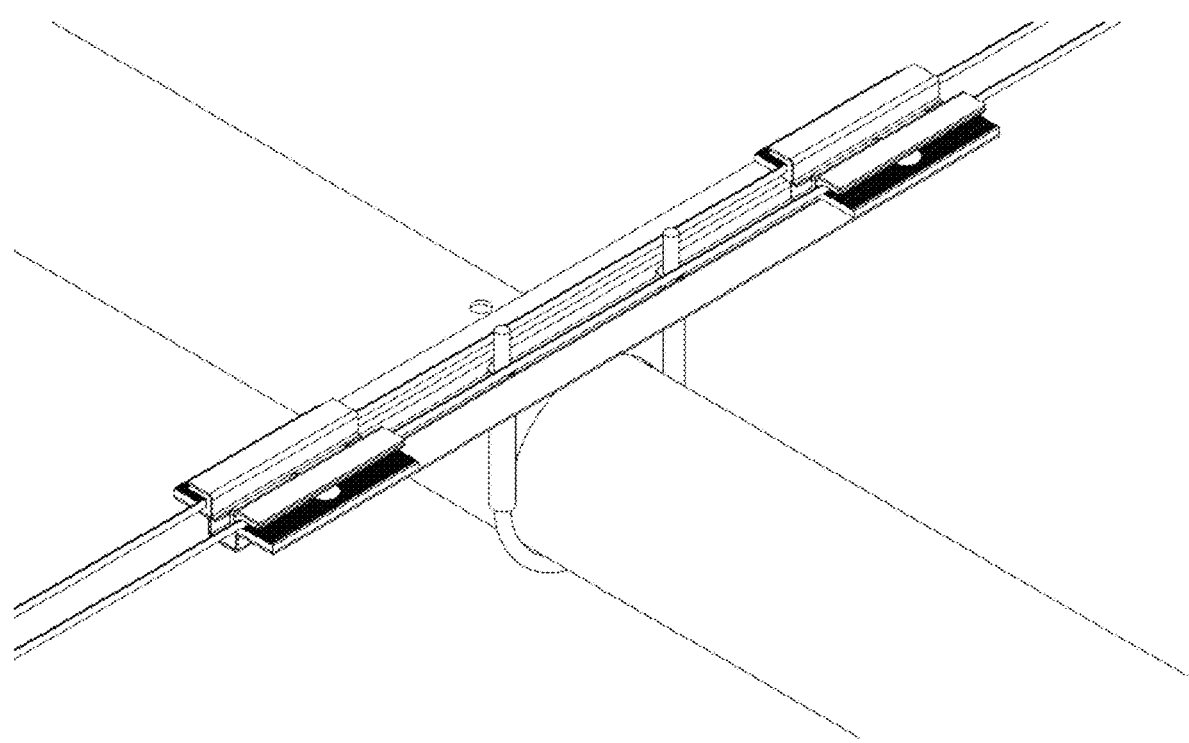
FIG. 20 is a perspective view of an assembled clamp assembly, including a pair of locking spacers, configured on a torque tube of a solar tracker apparatus, according to an embodiment of the present invention.
Figure 21:
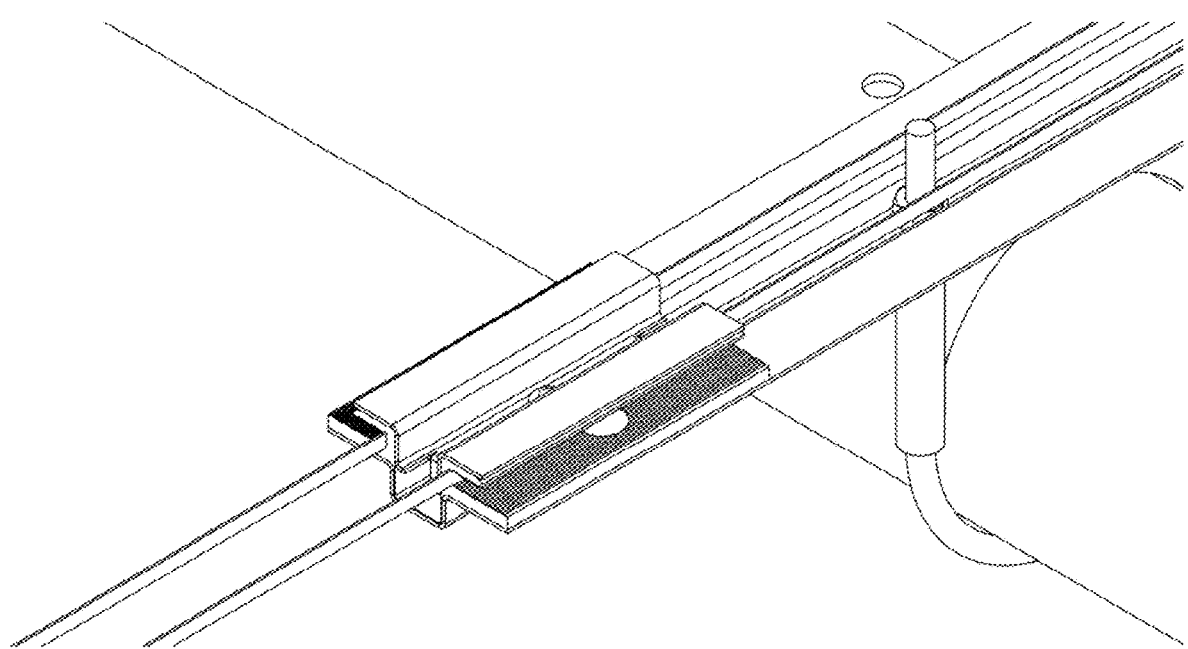
FIG. 21 is a more detailed perspective view of an assembled clamp assembly, including one of the pairs of locking spacers, configured on a torque tube of a solar tracker apparatus, according to an embodiment of the present invention.

FIG. 20 is a perspective view of an assembled clamp assembly, including a pair of locking spacers, configured on a torque tube of a solar tracker apparatus, according to an embodiment of the present invention. As shown, the assembly is an assembled view of the upper clamp structures, including first and second, and associated first and second bolt fasteners. The assembly has the locking spacers. The assembly also has a solar glass, including a polycarbonate puck affixed to an edge region, which will be inserted into an opening on the locking spacer. Solar glass is also shown opposing each other. The assembly also shows the U-bolt coupled to a periphery of the torque tube. FIG. 21 is a more detailed perspective view of an assembled clamp assembly, including one of the pairs of locking spacers, configured on a torque tube of a solar tracker apparatus, according to an embodiment of the present invention.

Figure 22:
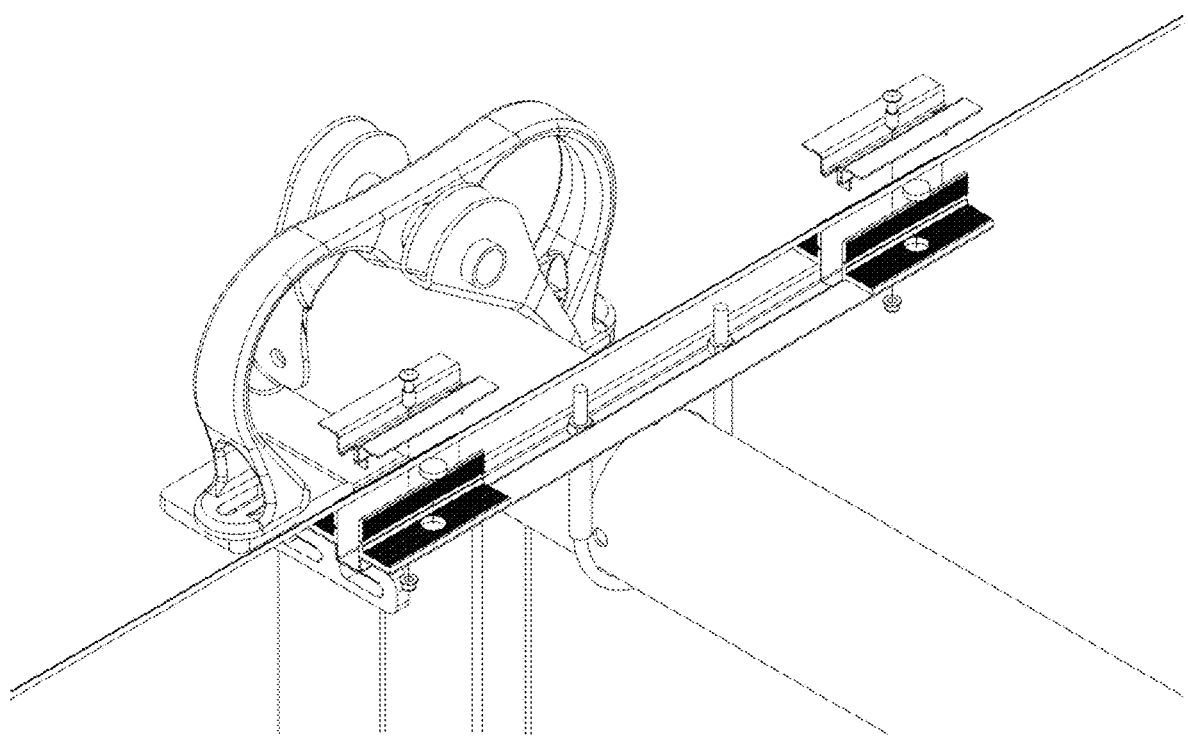
FIG. 22 is a perspective view of assembling a clamp assembly, including a pair of locking spacers, configured on a solar tracker apparatus, according to an embodiment of the present invention.

FIG. 22 is a perspective view of assembling a clamp assembly, including a pair of locking spacers, configured on a solar tracker apparatus, according to an embodiment of the present invention. As shown, the assembly is an exploded view of the upper clamp structures, including first and second, and associated first and second bolt fasteners. The assembly has the locking spacers. The assembly also has a solar glass, including a polycarbonate puck affixed to an edge region, which will be inserted into an opening on the locking spacer. Opposing solar glass is also shown. The assembly also shows the U-bolt coupled to a periphery of the torque tube. In an example, a clamp assembly for the torque tube end is also shown.

Figure 23:
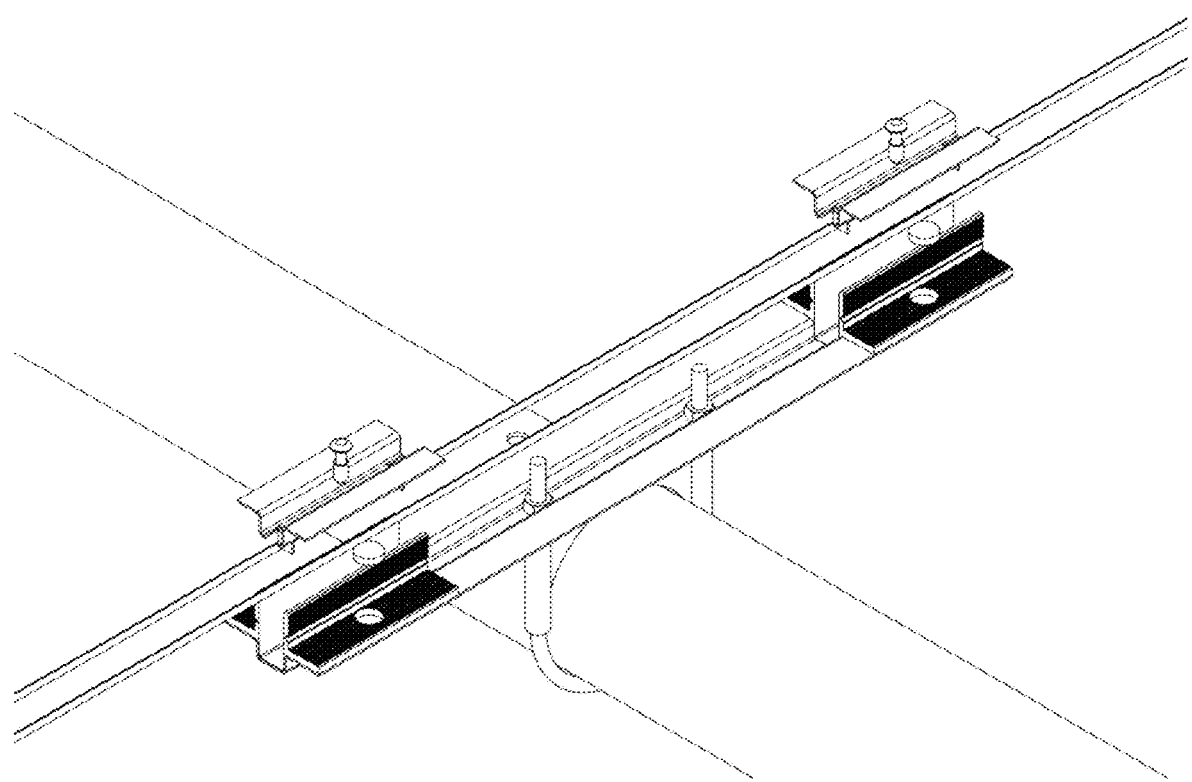
FIG. 23 is a perspective view of an assembling clamp assembly, including a pair of locking spacers, configured on a torque tube of a solar tracker apparatus, according to an embodiment of the present invention.

FIG. 23 is a perspective view of assembling clamp assembly, including a pair of locking spacers, configured on a torque tube of a solar tracker apparatus, according to an embodiment of the present invention. As shown, the assembly is an exploded view of the upper clamp structures, including first and second, and associated first and second bolt fasteners. The assembly has the locking spacers. The assembly also has a solar glass, including a polycarbonate puck affixed to an edge region, which will be inserted into an opening on the locking spacer. Opposing solar glass is also shown. The assembly also shows the U-bolt coupled to a periphery of the torque tube. In an example, a clamp assembly for the torque tube end is also shown.

Figure 24:
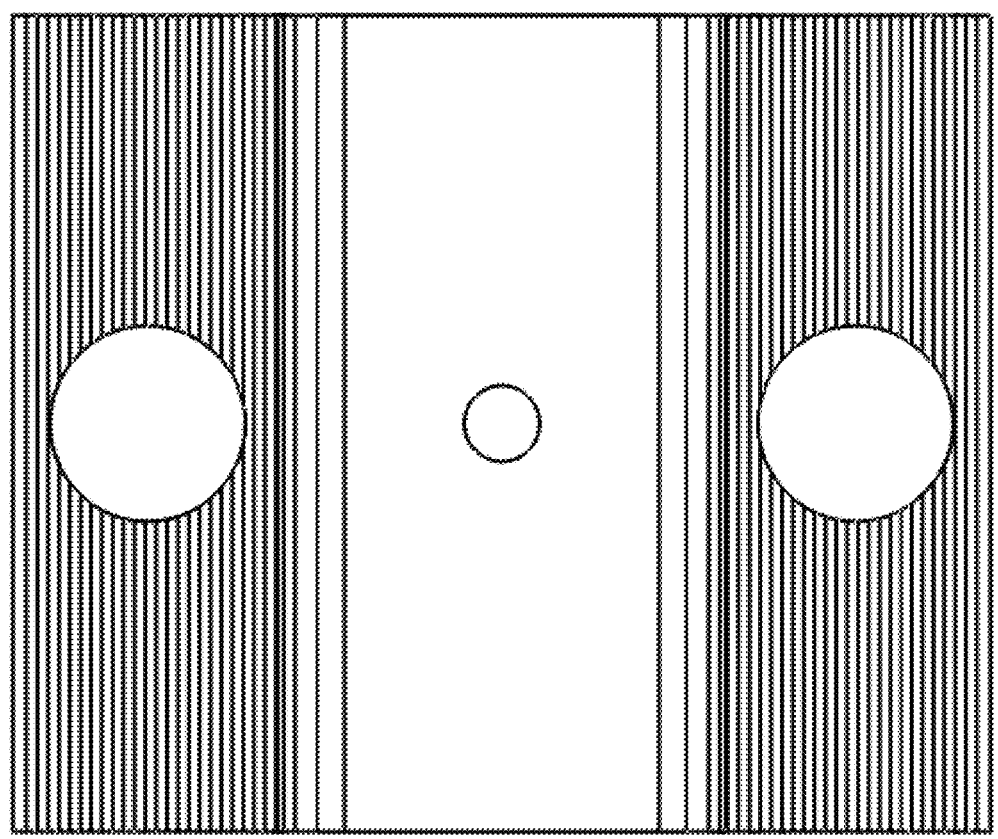
FIG. 24 is a top view of a locking spacer according to an embodiment of the present invention.

FIG. 24 is a top view of a locking spacer according to an embodiment of the present invention. As shown, the locking spacer includes a lower insulating region, which has openings on each of the regions. A center opening is provided for a fastener to fix the structure together. Each of the upper insulating regions is protruding out, and substantially normal to each major plane of the lower insulating regions. As also shown, each of the inner surfaces of the lower insulating regions is textured, including a plurality or ridges, to facility locking of the glass material of the solar modules. The ridges can also include other structures, such as annular regions, suctions cups, or other variations of lines, circles, or combinations thereof, and the like. Also shown is a bottom of a top-hat structure of the channel structure configured between the pair of lower insulating regions and upper insulating regions.

Figure 25:
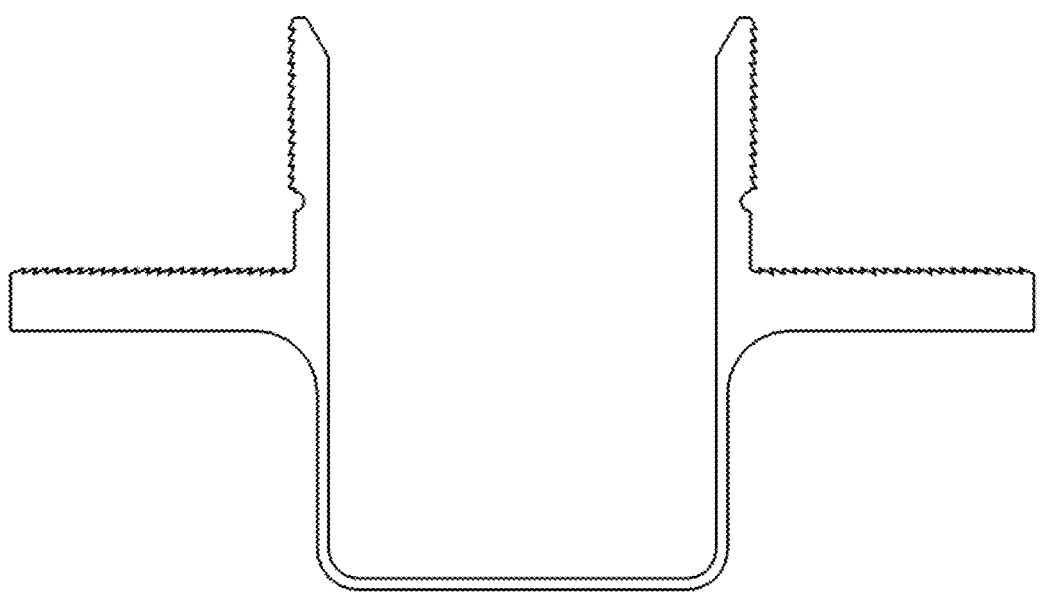
FIG. 25 is a front view of a locking spacer according to an embodiment of the present invention.

FIG. 25 is a front view of a locking spacer according to an embodiment of the present invention. As shown, the locking spacer includes a lower insulating region, which has openings (not shown) on each of the regions. A center opening (not shown) is provided for a fastener to fix the structure together. Each of the upper insulating regions is protruding up, and substantially normal to each major plane of the lower insulating regions. As also shown, each of the inner surfaces of the lower insulating regions is textured, including a plurality or ridges, to facility locking of the glass material of the solar modules. The ridges can also include other structures, such as annular regions, suctions cups, or other variations of lines, circles, or combinations thereof, and the like. Each inner surface region of the upper insulating regions is textured as well for similar reasons. Also shown is a bottom of a top-hat structure of the channel structure configured between the pair of lower insulating regions and upper insulating regions. The spacer also includes a spacing thickness defining a gap region, which is spatially configured within a vicinity of a bend region, which extends along a length of each of the insulating regions.

Figure 26:
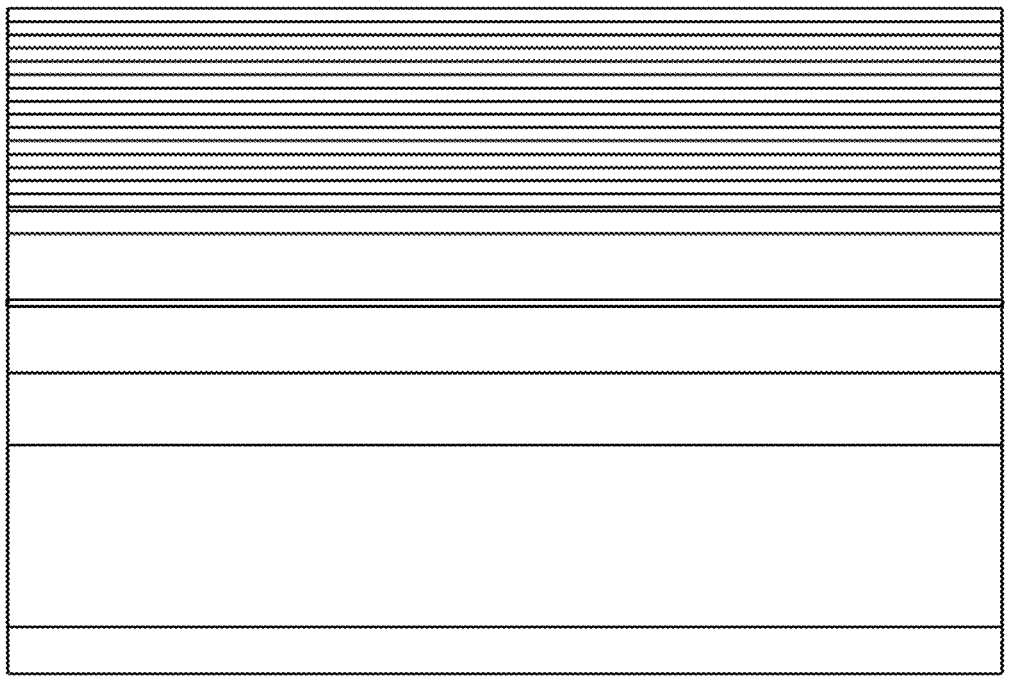
FIG. 26 is a side view of a locking spacer according to an embodiment of the present invention.

FIG. 26 is a side view of a locking spacer according to an embodiment of the present invention. As shown, the spacer includes a bottom of a channel, height of channel, lower insulating region, gap region, bend region, and upper insulating region in an example.

Figure 27:
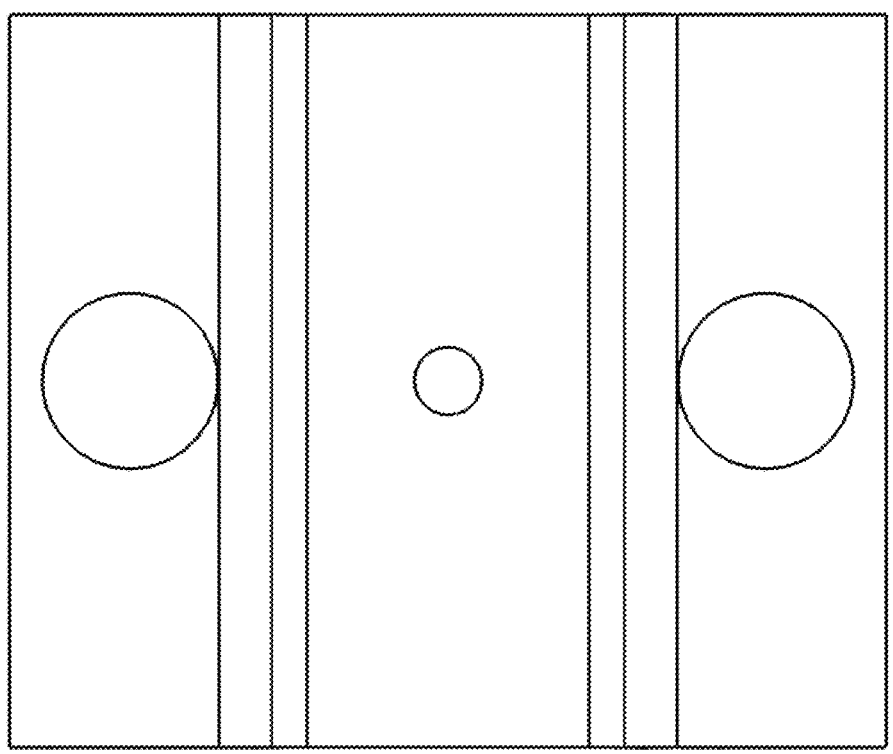
FIG. 27 is a bottom view of a locking spacer according to an embodiment of the present invention.

FIG. 27 is a bottom view of a locking spacer according to an embodiment of the present invention. As shown, the spacer has a pair of bottom insulating regions configured between a bottom region of a channel structure, which is shaped as a top-hat. Each of the bottom regions has an opening to be configured with a key structure affixed to glass material on the solar panel.

Figure 28:
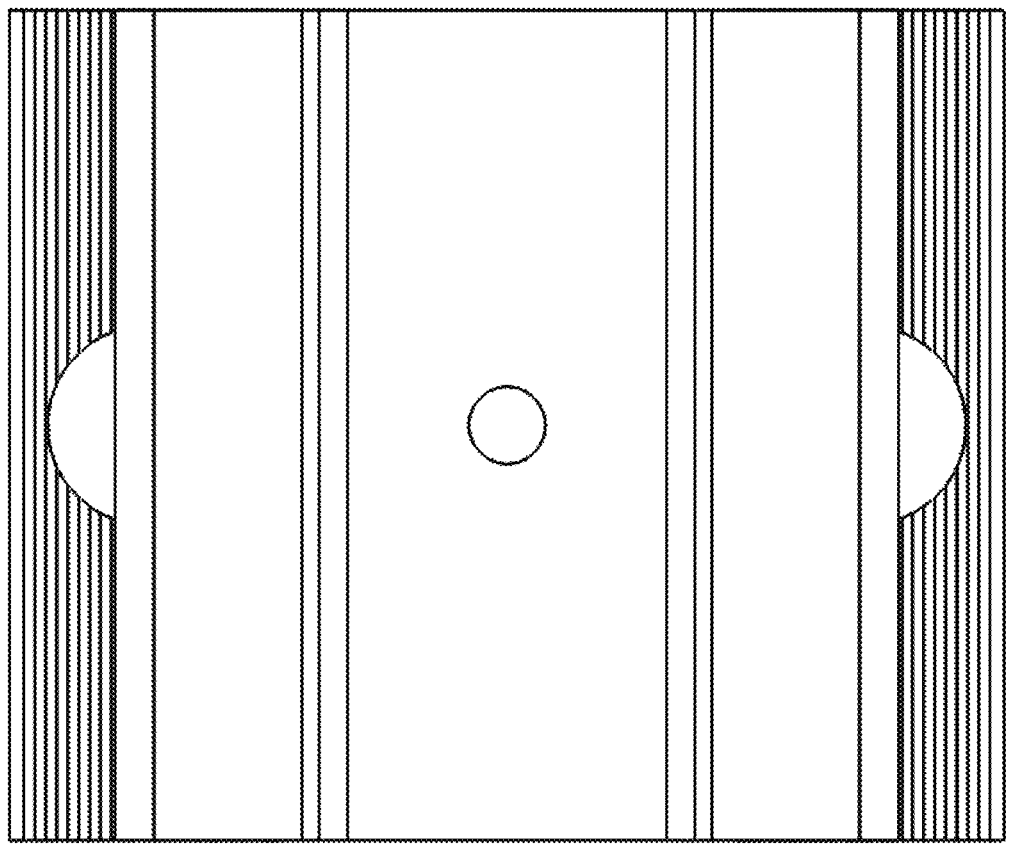
FIG. 28 is a top view of a locking spacer according to an embodiment of the present invention.

FIG. 28 is a top view of a locking spacer according to an embodiment of the present invention. As shown, the locking spacer includes a lower insulating region, which has openings on each of the regions. A center opening is provided for a fastener to fix the structure together. Each of the upper insulating regions is protruding out, and substantially parallel to each major plane of the lower insulating regions. As also shown, each of the inner surfaces of the lower insulating regions is textured, including a plurality or ridges, to facility locking of the glass material of the solar modules. The ridges can also include other structures, such as annular regions, suctions cups, or other variations of lines, circles, or combinations thereof, and the like. Each inner surface region of the upper insulating regions is textured as well for similar reasons. A bottom of a top-hat structure of the channel structure is configured between the pair of lower insulating regions and upper insulating regions (as will be shown in the later Figures). The spacer also includes a spacing thickness defining a gap region, which is spatially configured within a vicinity of a bend region, which extends along a length of each of the insulating regions (also will be shown). Between each of the insulating regions includes a thickness of glass material from a solar module (also will be shown). Each of the widths of the lower insulating regions extends out longer than each of the corresponding upper insulating regions, as shown in an example.

In an example, the locking spacer is made of a single integrated structure. The structure is monolithic, but can also have other variations. In an example, the upper insulating region has a thickness of polymeric material. Such thickness of polymeric material is thinner than a thickness of the lower insulating region, as shown. In an example, the upper insulating region has a beveled region from an upper surface to a lower surface to facility assembly and other benefits. In an example, the bevel is slanted outwardly from the upper surface of the upper insulating region to the lower surface or inner surface of the upper insulating region.

In an example, the spacing between the lower insulating region and the upper insulating region is defined by a gap. A thickness of glass material is inserted into the gap, while a key structure is configured with an opening on each of the bottom insulating regions.

In an example, the top-hat structure has a lower flat region, including a pair of sides, which defines the top-hat structure, and each of the lower insulating regions, which protrude normal to each of the sides that defines the brim of the top-hat. Of course, there can be other variations, modifications, and alternatives.

In an example, the locking spacer can be made of an insulating material. In an example, the insulating material can be a rubber, polymer, or other compliant and/or compressive material. In an example, the spacer can be made of a combination of materials, including different layers, or the same layer, or have other desirable structures. Of course, there can be other variations, modifications, and alternatives.

Figure 29:
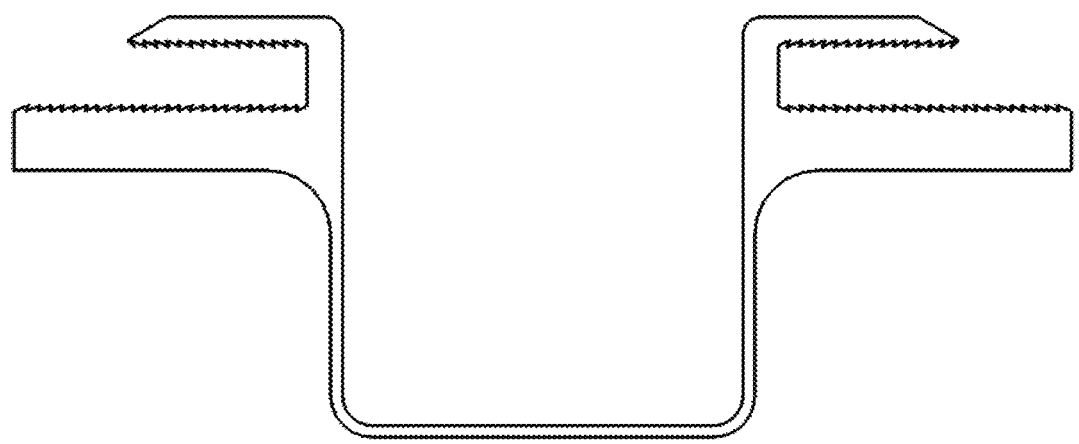
FIG. 29 is a front view of a locking spacer according to an embodiment of the present invention.

FIG. 29 is a front view of a locking spacer according to an embodiment of the present invention. As shown, the locking spacer includes a lower insulating region, which has openings (not shown) on each of the regions. A center opening (not shown) is provided for a fastener to fix the structure together. Each of the upper insulating regions is protruding out, and substantially parallel to each major plane of the lower insulating regions. As also shown, each of the inner surfaces of the lower insulating regions is textured, including a plurality or ridges, to facility locking of the glass material of the solar modules. The ridges can also include other structures, such as annular regions, suctions cups, or other variations of lines, circles, or combinations thereof, and the like. Each inner surface region of the upper insulating regions is textured as well for similar reasons. Also shown is a bottom of a top-hat structure of the channel structure configured between the pair of lower insulating regions and upper insulating regions. The spacer also includes a spacing thickness defining a gap region, which is spatially configured within a vicinity of a bend region, which extends along a length of each of the insulating regions. Between each of the insulating regions includes a thickness of glass material from a solar module.

Figure 30:
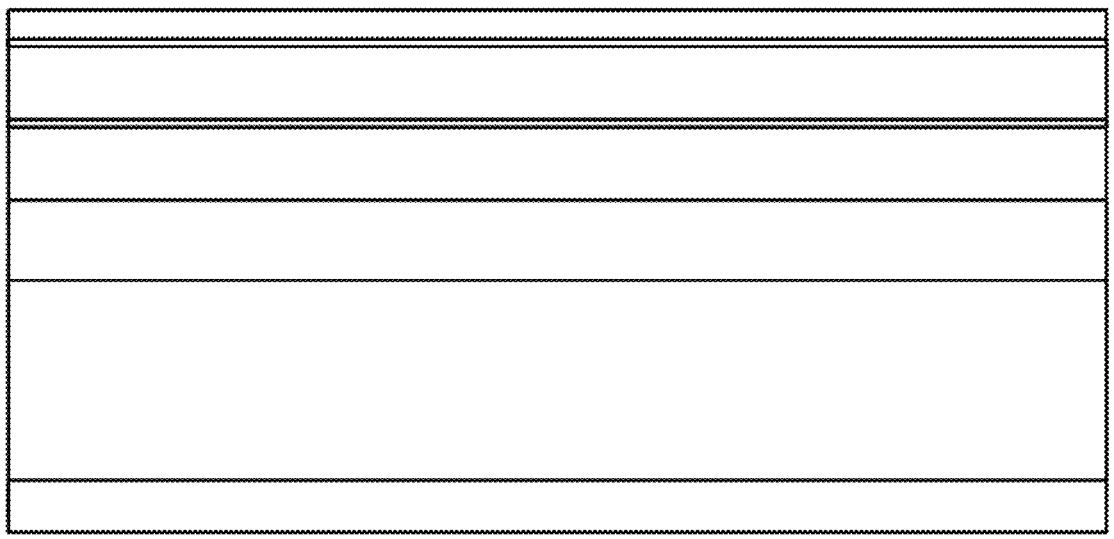
FIG. 30 is a side view of a locking spacer according to an embodiment of the present invention.

FIG. 30 is a side view of a locking spacer according to an embodiment of the present invention. As shown, the spacer includes a bottom of a channel, height of channel, lower insulating region, gap region, bend region, and upper insulating region in an example.

Figure 31:
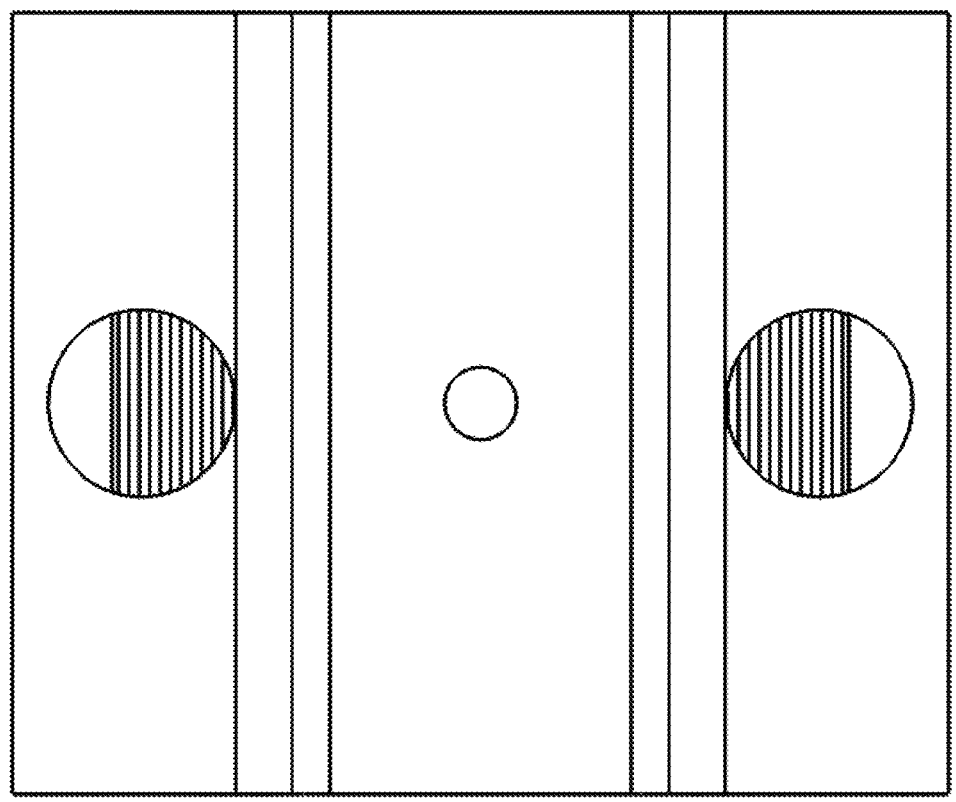
FIG. 31 is a bottom view of a locking spacer according to an embodiment of the present invention.

FIG. 31 is a bottom view of a locking spacer according to an embodiment of the present invention. As shown, the spacer has a pair of bottom insulating regions configured between a bottom region of a channel structure, which is shaped as a top-hat. Each of the bottom regions has an opening to be configured with a key structure affixed to glass material on the solar panel. A portion of the inner region of the upper insulating region is also shown.

In a specific embodiment, the present invention provides a tracker apparatus for solar modules. The tracker apparatus has a first pier comprising a first pivot device and a second pier comprising a drive mount. The drive mount is capable for construction tolerances in at least three-axis, and is configured to a drive device. The drive device has an off-set clamp device coupled to a cylindrical bearing device coupled to a clamp member. The apparatus has a cylindrical torque tube operably disposed on the first pier and the second pier. The cylindrical torque tube comprises a first end and a second end, and a notch. The notch is one of a plurality of notches spatially disposed along a length of the cylindrical torque tube. The apparatus has a clamp configured around an annular portion of the cylindrical torque tube and mate with the notch to prevent movement of the clamp. The clamp comprises a support region configured to support a portion of a solar module.

In an alternative embodiment, the present invention provides an alternative solar tracker apparatus. The apparatus has a drive device, a crank coupled to the drive device and configured in an offset manner to a frame assembly. The frame assembly is coupled to a plurality of solar modules.

In an example, the apparatus has a continuous torque tube spatially disposed from a first region to a second region. The crank comprises a first crank coupled to a first side of the drive device and a second crank coupled to a second side of the drive device. The crank comprises a first crank coupled to a first side of the drive device and a second crank coupled to a second side of the drive device; and further comprises a first torque tube coupled to the first crank and a second torque tube coupled to the second crank. The crank comprises a first crank coupled to a first side of the drive device and a second crank coupled to a second side of the drive device; and further comprises a first torque tube coupled to the first crank and a second torque tube coupled to the second crank, and further comprises a first swage fitting coupling the first crank to the first torque tube and a second swage fitting coupling the second crank to the second torque tube. The apparatus also has a pier coupled to the drive device. In an example, the apparatus also has a drive mount coupled to a pier. In an example, multiple drive devices including an off-set crank or other configuration can be used to further scale the length of the torque tube. That is, a pair of drives can be spatially disposed along the torque tube, among other variations.

In an alternative embodiment, the present invention provides an alternative solar tracker apparatus. The apparatus has a center of mass with an adjustable hanger assembly configured with a clam shell clamp assembly on the adjustable hanger assembly and a cylindrical torque tube comprising a plurality of torque tubes configured together in a continuous length from a first end to a second end such that the center of mass is aligned with a center of rotation of the cylindrical torque tubes to reduce a load of a drive motor operably coupled to the cylindrical torque tube.

In an example, the drive motor is operable to move the torque tube about the center of rotation and is substantially free from a load. The center of rotation is offset from a center of the cylindrical torque tube.

In an alternative embodiment, the present invention provides a solar tracker apparatus. The apparatus has a clamp housing member configured in a upright direction. The clamp housing member comprises a lower region and an upper region. The lower region is coupled to a pier structure, and the upper region comprises a spherical bearing device. The upright direction is away from a direction of gravity. The apparatus has a clam shell clamp member coupled to the cylindrical bearing and a torque tube coupled to the spherical bearing to support the torque tube from the upper region of the clamp housing member. The torque tube is configured from an off-set position from a center region of rotation.

In an example, the apparatus is configured substantially free from any welds during assembly. Reduced welding lowers cost, improves installation time, avoids errors in installation, improves manufacturability, and reduces component count through standardized parts. The torque tube is coupled to another torque tube via a swage device within a vicinity of the clam shall clamp member. In an example, the connection is low cost, and provides for strong axial and torsional loading. The apparatus is quick to install with the pokey-yoke design. The torque tube is coupled to an elastomeric damper in line to dampen torque movement to be substantially free from formation of a harmonic waveform along any portion of a plurality of solar panels configured to the torque tube. The apparatus also has a locking damper or rigid structure to configure a solar panel coupled to the torque tube in a fixed tilt position to prevent damage to stopper and lock into a foundation—in a position that is substantially free from fluttering in an environment with high movement of air. The apparatus further comprises a controller apparatus configured in an inserter box provided in an underground region to protect the controller apparatus. The apparatus has a drive device to linearly actuate the torque tube. In an example, the apparatus uses an electrical connection coupled to a drive device. In an example, the spherical bearing allows for a construction tolerance, tracker movement, and acts as a bonding path of least resistance taking an electrical current to ground. The apparatus can be one of a plurality of tracker apparatus configured in an array within a geographic region. Each of the plurality of tracker apparatus is driven independently of each other to cause each row to stow independently at a different or similar angle.

Still further, the present invention provides a tracker apparatus comprising a clam shell apparatus, which has a first member operably coupled to a second member to hold a torque tube in place.

In an example, the apparatus also has a clamp housing operably coupled to the clam shell apparatus via a spherical bearing device such that the spherical bearing comprises an axis of rotation. The axis of rotation is different from a center of the torque tube. The apparatus further comprises a solar module coupled to the torque tube.

In an example, the invention provides a tracker apparatus comprising a plurality of torque tubes comprising a first torque tube coupled to a second torque tube coupled to an Nth torque tube, whereupon N is an integer greater than 2. Each pair of torque tubes is coupled to each other free from any welds.

In an example, each pair of torque tubes is swaged fitted together. Each of the torque tubes is cylindrical in shape. Each of the plurality of torque tubes is characterized by a length greater than 80 meters. Each of the torque tubes comprises a plurality of notches. In an example, the apparatus also has a plurality of U-bolt devices coupled respectively to the plurality of notches. Each of the plurality of torque tubes are made of steel.

In an alternative embodiment, the present invention provides a tracker apparatus having a pier member comprising a lower region and an upper region. A clamp holding member is configured to the upper region and is capable of moving in at least a first direction, a second direction opposite to the first direction, a third direction normal to the first direction and the second direction, a fourth direction opposite of the third direction, a fifth direction normal to the first direction, the second direction, the third direction, and the fourth direction, and a sixth direction opposite of the fifth direction.

In yet an alternative embodiment, the present invention provides a solar tracker apparatus. The apparatus has a clamp housing member configured in a upright direction. The clamp housing member comprises a lower region and an upper region. The lower region is coupled to a pier structure. The upper region comprises a spherical bearing device. The upright direction is away from a direction of gravity. The apparatus has a clam shell clamp member coupled to the cylindrical bearing and the clam shell clamp being suspended from the cylindrical bearing. In an example, the apparatus has a torque tube comprising a first end and a second end. The first end is coupled to the spherical bearing to support the torque tube from the upper region of the clamp housing member. The torque tube is configured from an off-set position from a center region of rotation. The apparatus has a drive device coupled to the second end such that the drive device and the torque tube are configured to be substantially free from a twisting action while under a load, e.g., rotation, wind, other internal or external forces.

In an example, other co-pending applications describe examples of a solar tracker. Such co-pending applications including "HORIZONTAL BALANCED SOLAR TRACKER," listed under U.S. Ser. No. 14/101,273 filed Dec. 9, 2013, "OFF-SET DRIVE ASSEMBLY FOR SOLAR TRACKER," listed under U.S. Ser. No. 14/489,409 filed Sep. 17, 2014, "OFF-SET SWIVEL DRIVE ASSEMBLY FOR SOLAR TRACKER," listed under U.S. Ser. No. 14/489,412 filed Sep. 17, 2014, and "CLAMP ASSEMBLY FOR SOLAR TRACKER," listed under U.S. Ser. No. 14/489,416 filed Sep. 17, 2014, each of which is commonly assigned, and hereby incorporated by reference for all purposes. Of course, there can be other variations.

It is understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A spacer device for fitting around an edge of a solar module, comprising:
   a lower insulating region; and
   an upper insulating region configured to move between an open position and a closed position;
   a spacer region coupling the lower insulating region to the upper insulating region, the spacer region defining a gap extending between the lower insulating region and the upper insulating region when the upper insulating region is in the closed position; and
   a bend region disposed between the upper insulating region and the spacer region, the bend region having a thickness that is less than a thickness of the upper insulating region and a thickness of the spacer region to enable the upper insulating region to transition from the open position to the closed position about the bend region.

2. The spacer device of claim 1, wherein when the upper insulating region is in the closed position, the lower insulating region and the upper insulating region are oriented approximately parallel to a major plane of a solar module.

3. The spacer device of claim 1, wherein the bend region is v-shaped and enables each inner surface of the v-shaped bend region to contact each other when the upper insulating region is in the closed position.

4. The spacer device of claim 1, further comprising:
an opposing lower insulating region;
an opposing upper insulating region coupled to the lower insulating region via an opposing spacer region, the opposing spacer region defining an opposing gap extending between the opposing lower insulating region and the opposing upper insulating region;
an opposing bend region disposed between the opposing spacer region and the opposing upper insulating region; and
a channel structure coupling the opposing lower insulating region with the lower insulating region.

5. The spacer device of claim 1, further comprising a key structure configured to prevent planar movement of a solar module when an edge of the solar module is clamped within the spacer device.

6. The spacer device of claim 1, wherein the spacer device comprises a polymeric material.

7. The spacer device of claim 6, wherein the polymeric material is selected from at least one of an ethylene propylene diene monomer (EPDM) or a rubber.

8. The spacer device of claim 1, wherein an inner surface of each of the lower insulating region and the upper insulating region is textured to facilitate securing a solar module within the spacer device.

9. The spacer device of claim 1, wherein an outer surface of the upper insulating region defines a beveled region adjacent an end surface of the upper insulating region.

10. A clamp assembly for securing to a solar module, comprising:
a locking spacer comprising:
    a lower insulating region defining a key structure opening, the key structure opening sized and shaped to receive a corresponding key structure of a solar module; and
    an upper insulating region coupled to the lower insulating region with a spacer region;
an upper clamp structure; and
a lower clamp structure configured to be secured to the upper clamp structure, the locking spacer disposed between the upper clamp structure and the lower clamp structure.

11. The clamp assembly of claim 10, wherein the lower clamp structure defines a rail structure having a pair of support regions, each of the pair of support regions protruding from the rail structure.

12. The clamp assembly of claim 10, wherein the upper clamp structure defines a rail structure having a pair of support regions, each of the pair of support regions protruding from the rail structure.

13. The clamp assembly of claim 10, further comprising a fastener configured to:
secure the upper clamp structure to the lower clamp structure; and
compress the upper clamp structure and the upper insulating region to the lower insulating region and the lower clamp structure to secure to the solar module.

14. The clamp assembly of claim 10, wherein the key structure opening of the lower insulating region is circular.

15. A clamp assembly for securing to a solar module, comprising:
a spacer comprising:
    a lower insulating region defining a key structure opening configured to receive a corresponding key structure of a solar module; and
    an upper insulating region coupled to the lower insulating region via a spacer region, the upper insulating region configured to move between an open position and a closed position, the spacer region defining a gap extending between the lower insulating region and the upper insulating region when the upper insulating region is in the closed position;
an upper clamp structure; and
a lower clamp structure configured to be secured to the upper clamp structure, wherein the spacer is disposed between the upper clamp structure and the lower clamp structure.

16. The clamp assembly of claim 15, wherein the upper insulating region moves between the open position and the closed position about a bend region disposed between the upper insulating region and the spacer region, the bend region having a thickness that is less than a thickness of the upper insulating region and the lower insulating region.

17. The clamp assembly of claim 15, further comprising a fastener configured to:
secure the upper clamp structure to the lower clamp structure; and
compress the upper clamp structure and the upper insulating region to the lower insulating region and the lower clamp structure to hold the solar module disposed between the upper insulating region and the lower insulating region.

18. The clamp assembly of claim 15, wherein the spacer comprises a polymeric material.

19. The clamp assembly of claim 15, wherein the key structure of the solar module is affixed to an edge region of the solar module.

20. The clamp assembly of claim 19, wherein the key structure has a height that is less than a thickness of the lower insulating region of the spacer.

* * * * *